Figure 12:
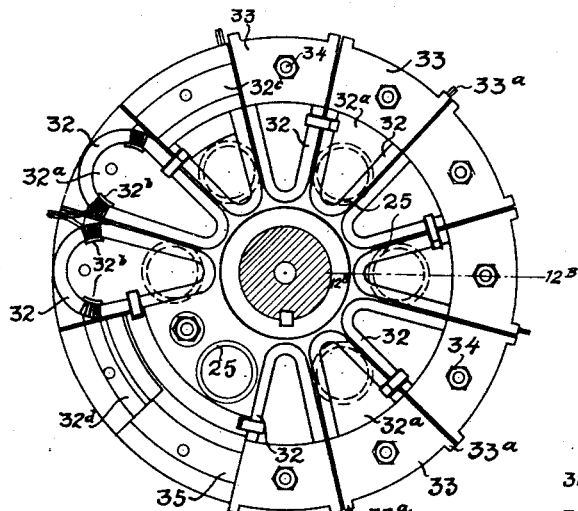
Figure 12:
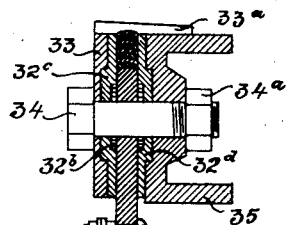

T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.
1,213,803.
Patented Jan. 23, 1917.
14 SHEETS—SHEET 1.
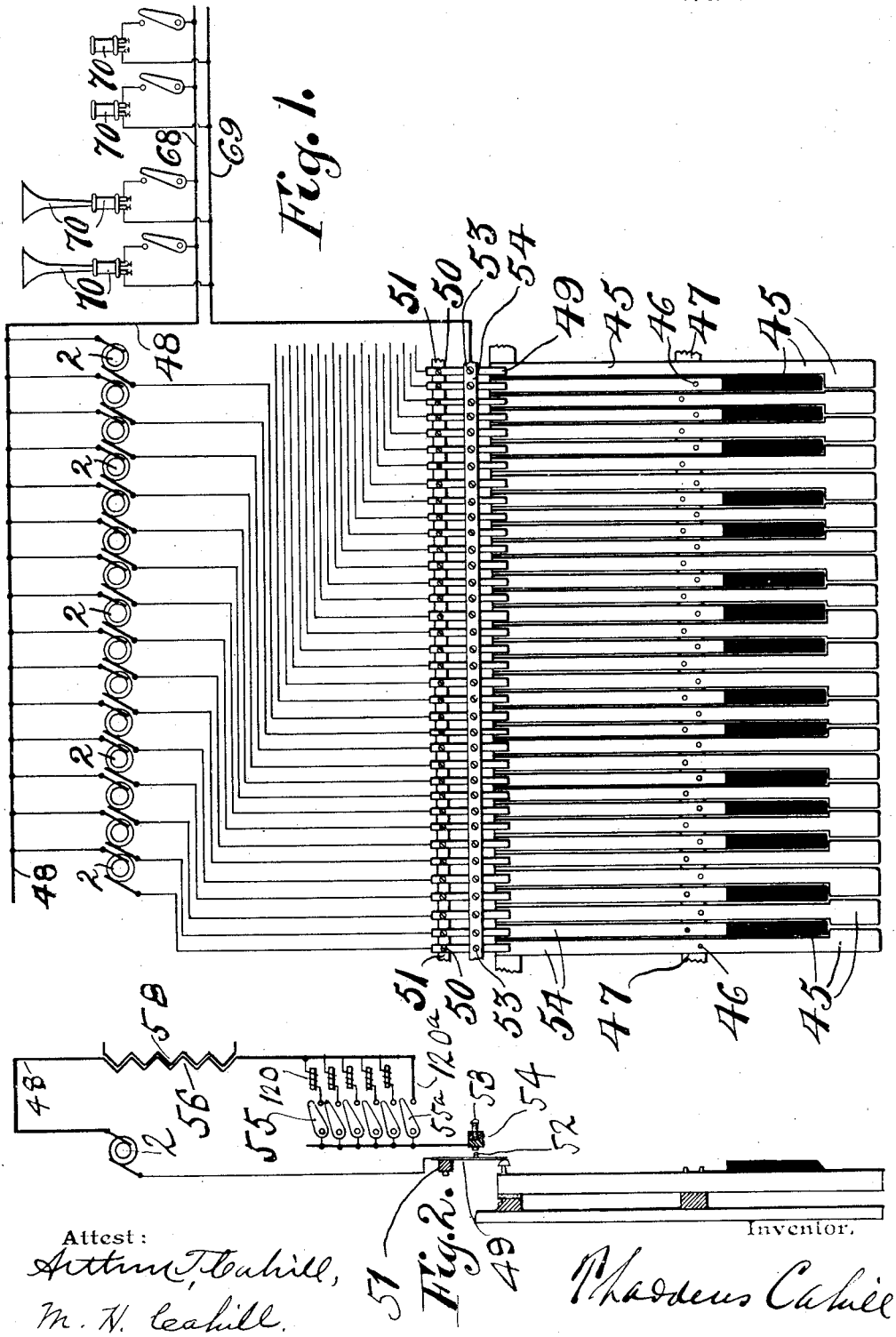
Attest:
Arthur T. Cahill,
M. N. Cahill.
Inventor.
Thaddeus Cahill T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.
1,213,803.
Patented Jan. 23, 1917.
14 SHEETS—SHEET 2.
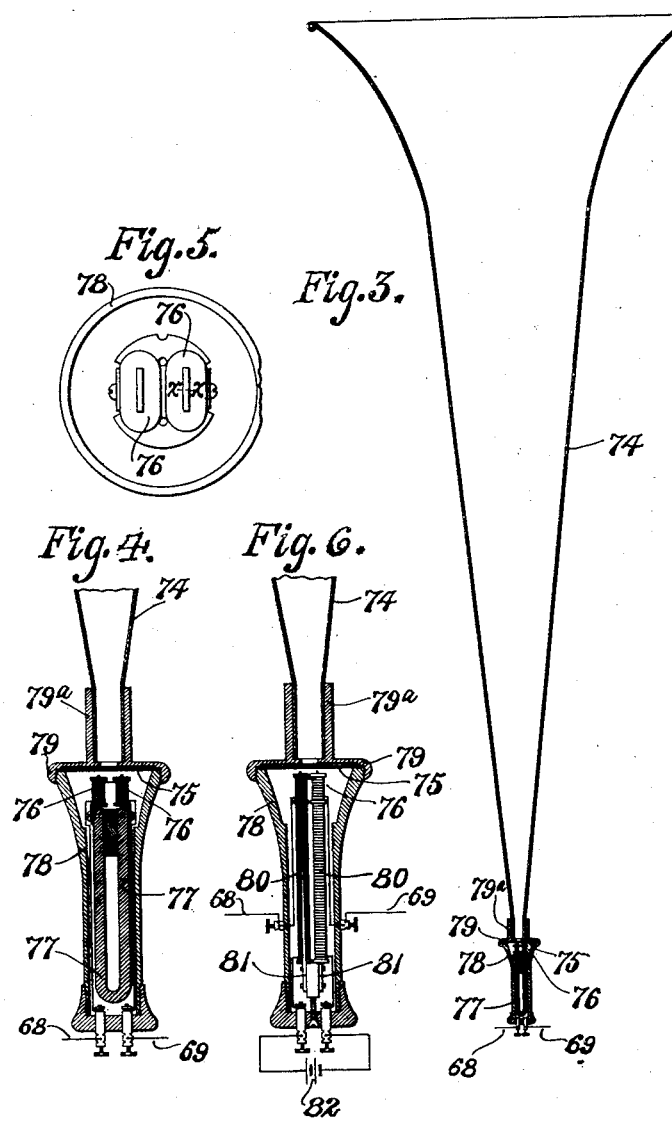
Attest:
Inventor.

T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.
1,213,803.
Patented Jan. 23, 1917.
14 SHEETS—SHEET 3.
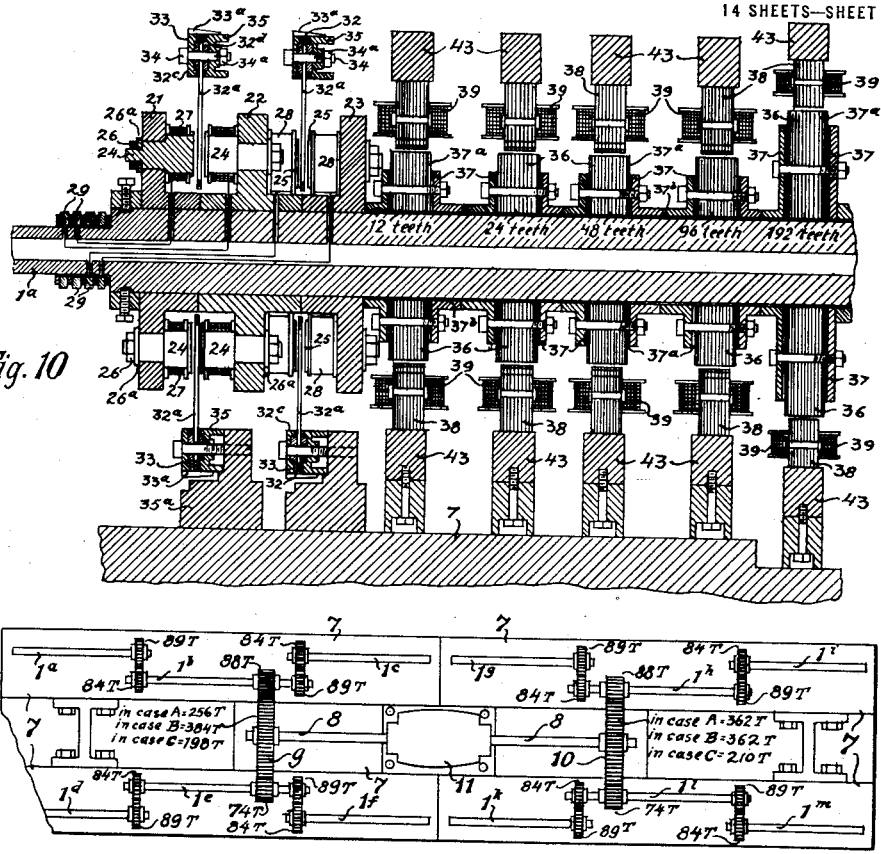
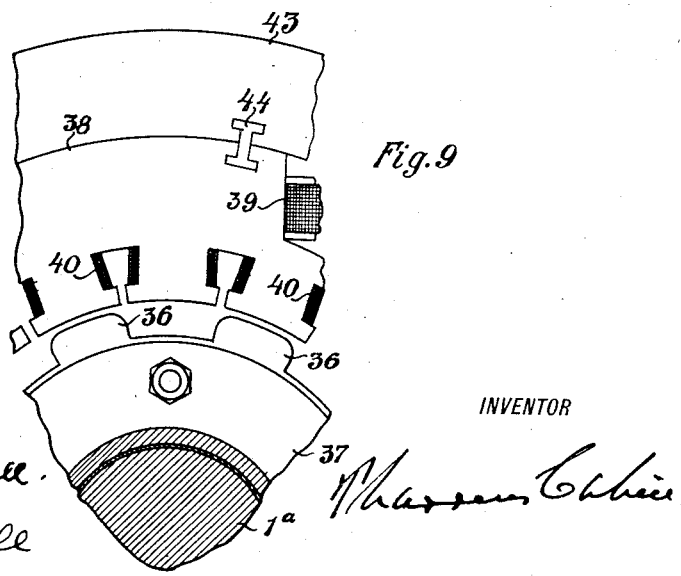
WITNESSES:
INVENTOR T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.
1,213,803.
Patented Jan. 23, 1917.
14 SHEETS—SHEET 4.
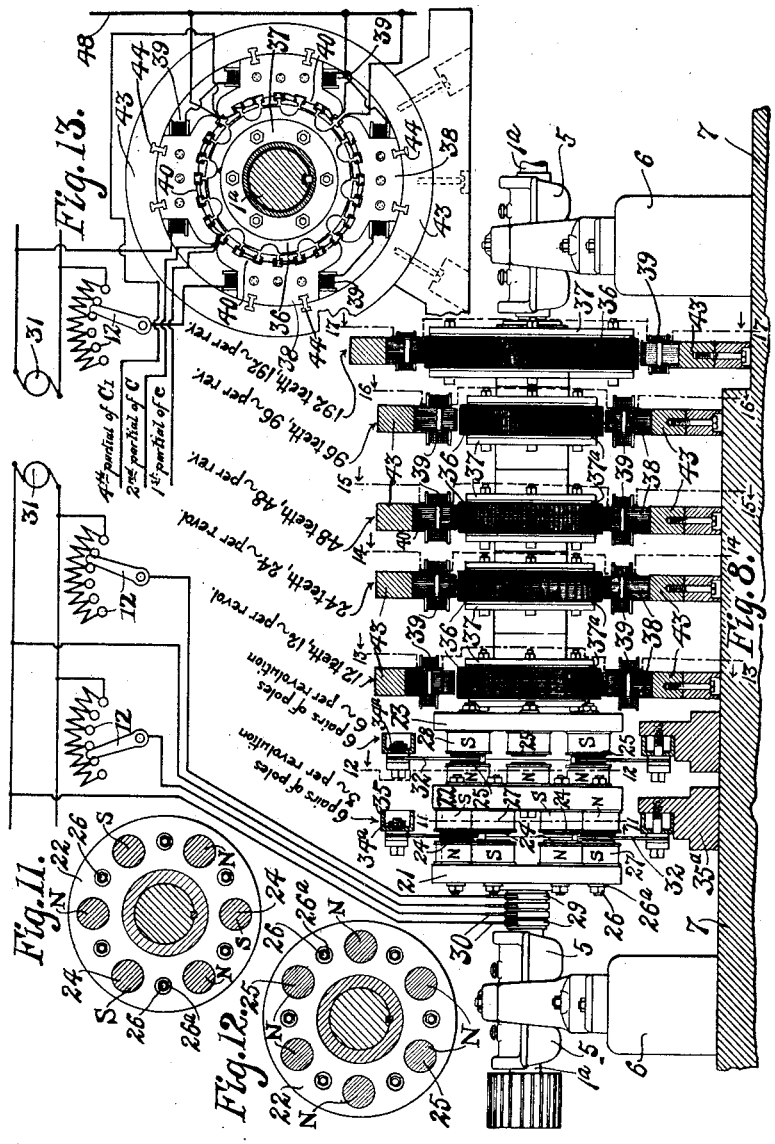
Attest:
Arthur T. Cahill,
M. H. Cahill.
Inventor.
Thaddeus Cahill T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.

1,213,803.
Patented Jan. 23, 1917.
14 SHEETS—SHEET 5.

WITNESSES:
Arthur T. Cahill
Mary N. Cahill

INVENTOR
Thaddeus Cahill

T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.
1,213,803.
Patented Jan. 23, 1917.
14 SHEETS—SHEET 6.
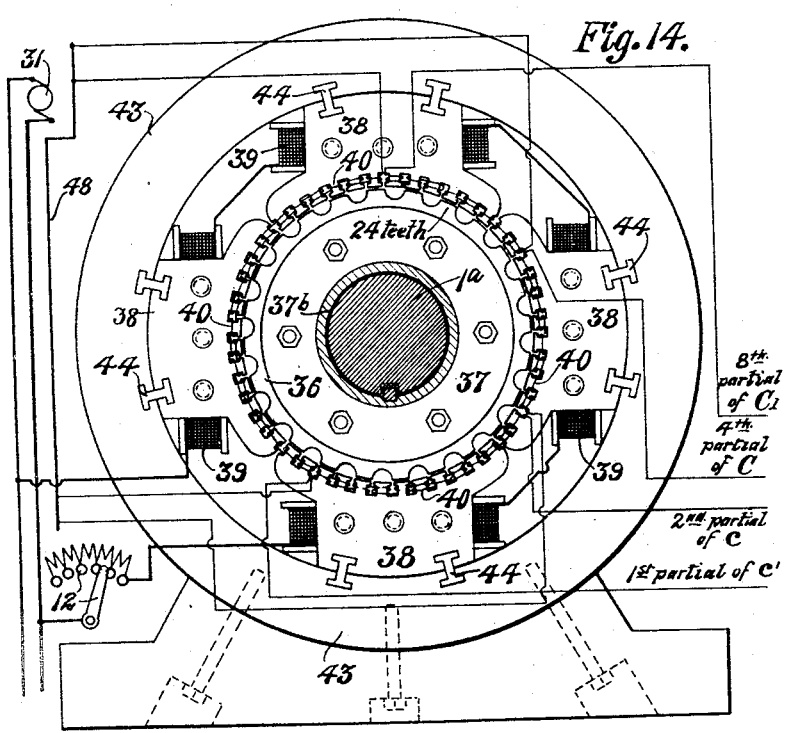
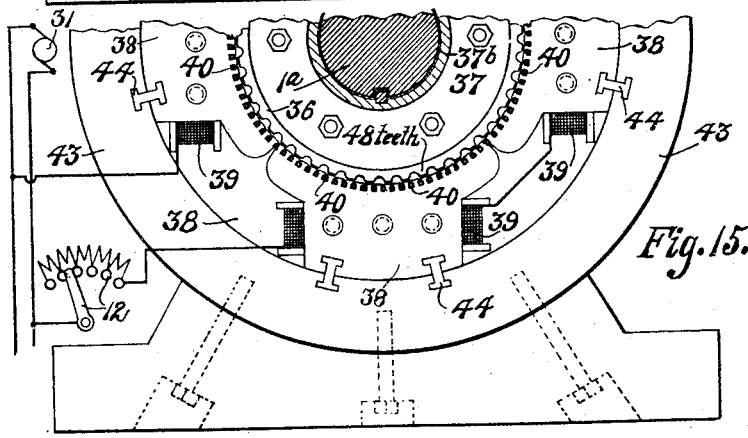
Attest:
Arthur T. Cahill,
M. H. Cahill.
Inventor.
Thaddeus Cahill

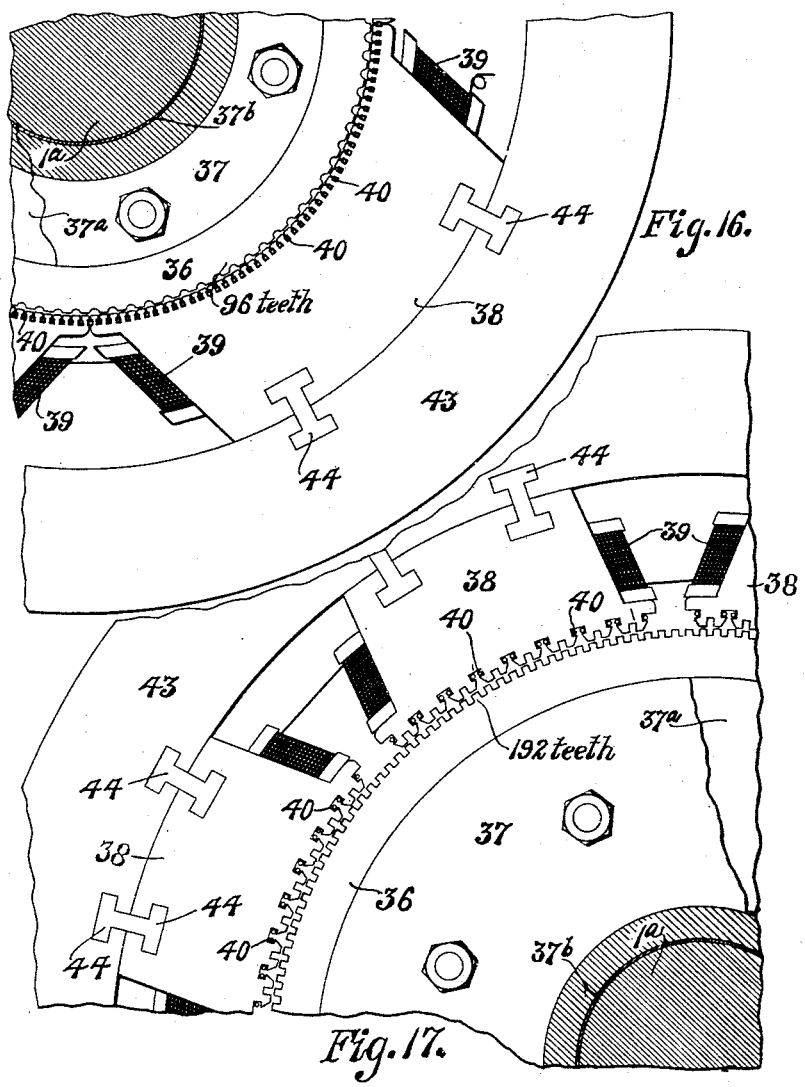

Fig. 18.

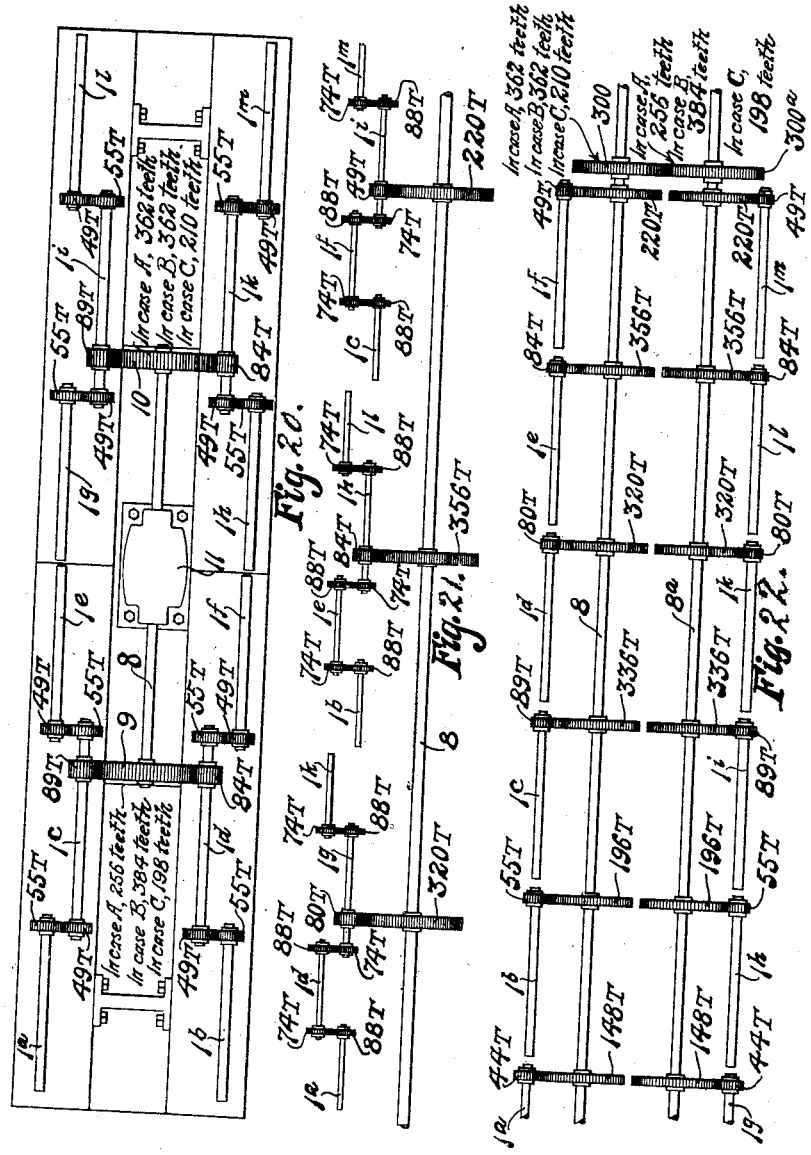

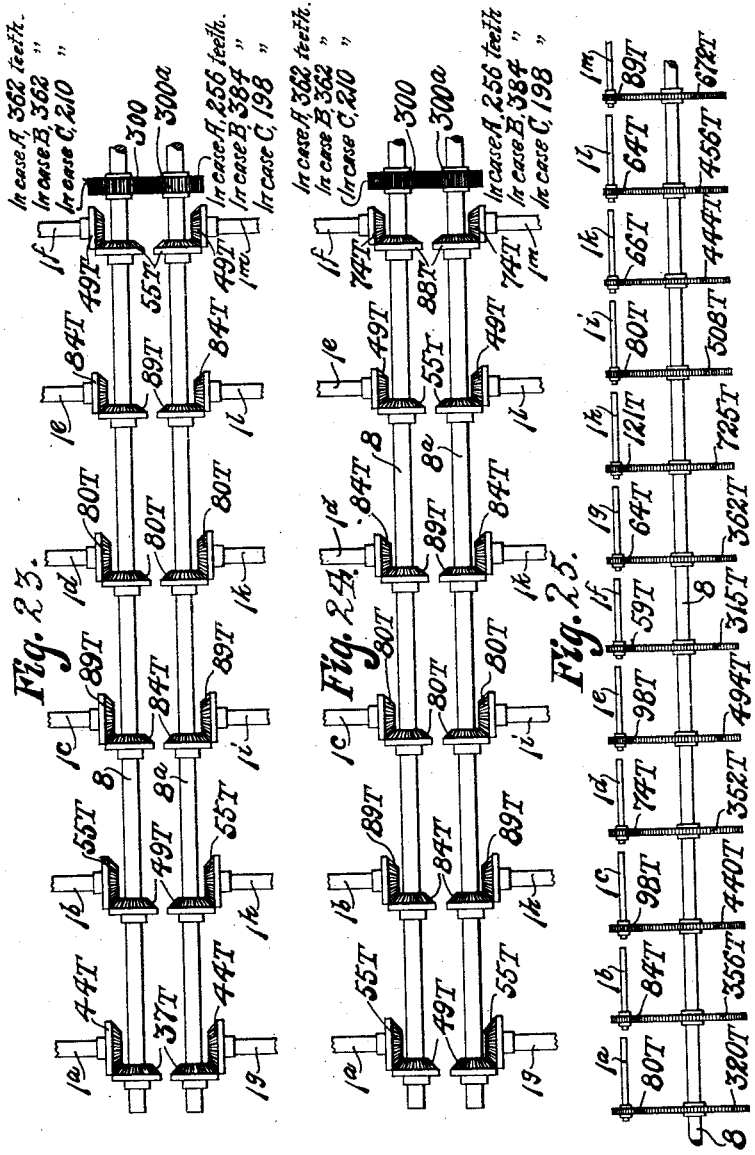

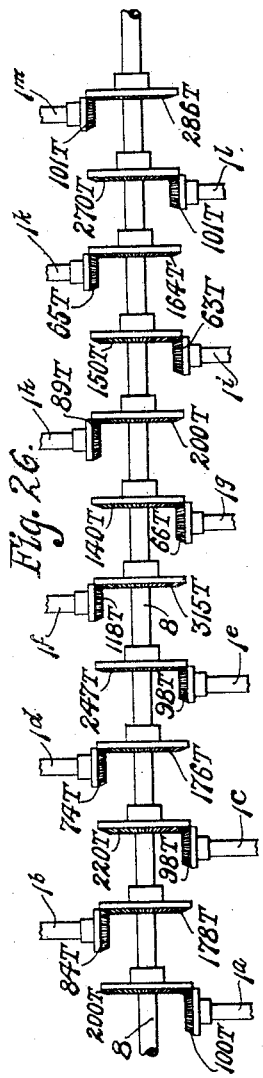
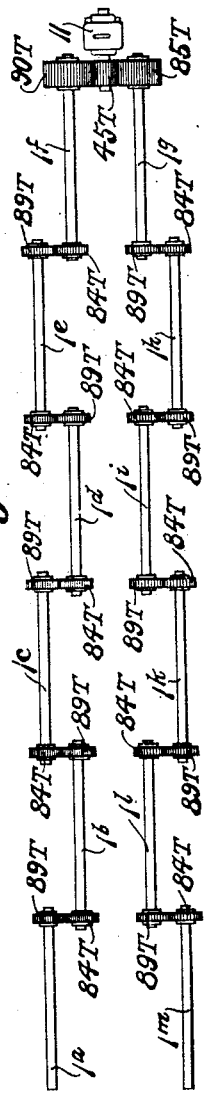
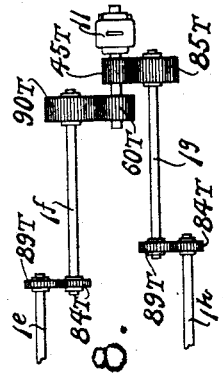

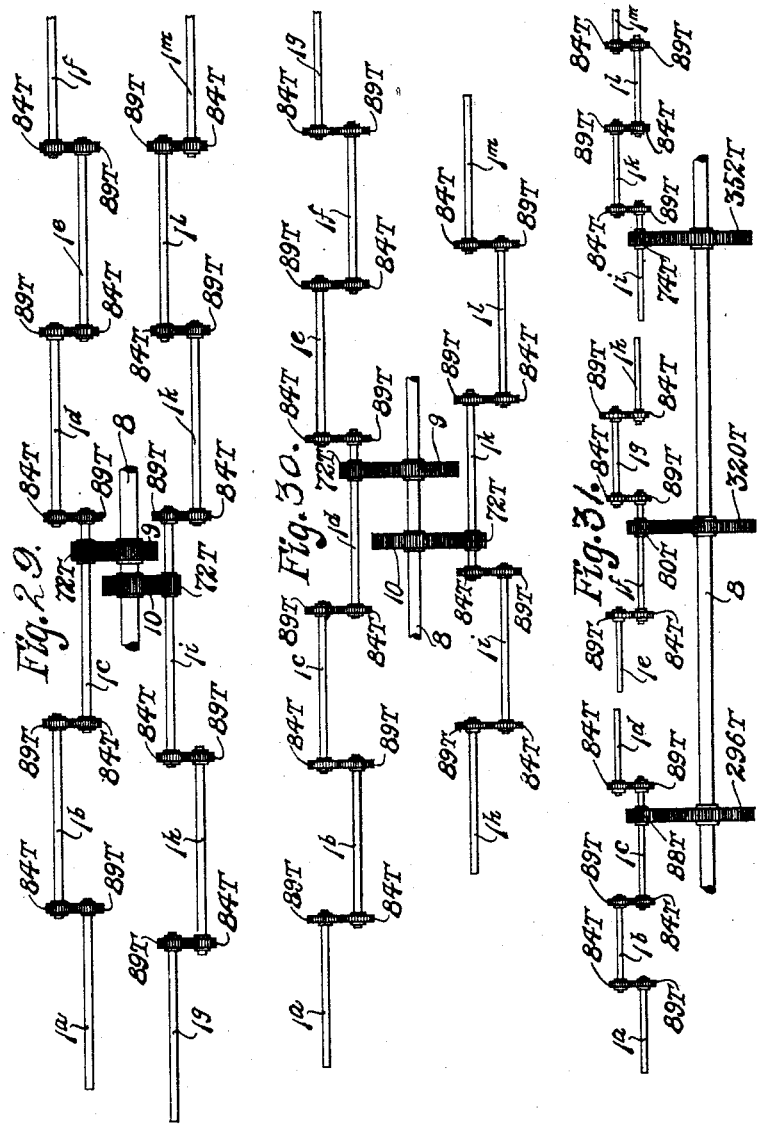

T. CAHILL.
ART OF AND APPARATUS FOR GENERATING AND DISTRIBUTING MUSIC ELECTRICALLY.
APPLICATION FILED FEB. 17, 1904. RENEWED DEC. 14, 1916.

1,213,803.

Patented Jan. 23, 1917.
14 SHEETS—SHEET 13.

WITNESSES:
Arthur T. Cahill.
Mary H. Cahill.

INVENTOR
Thaddeus Cahill

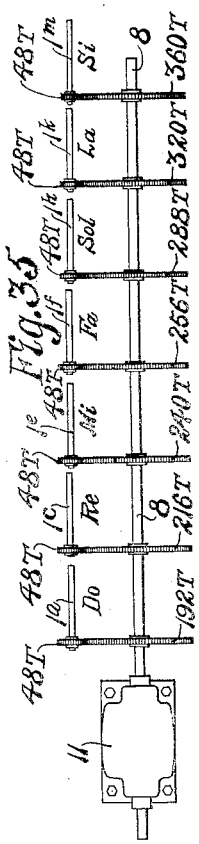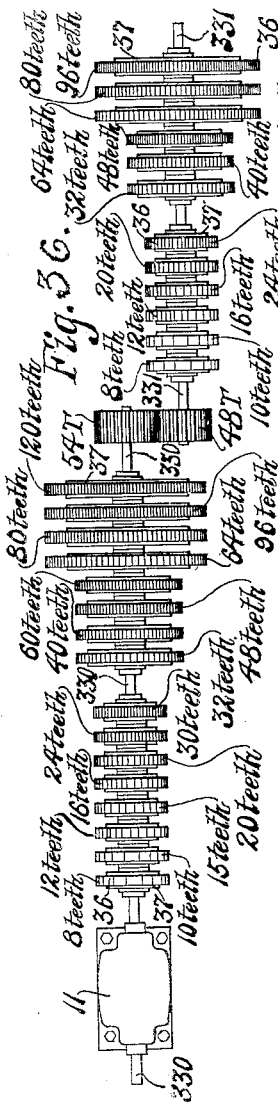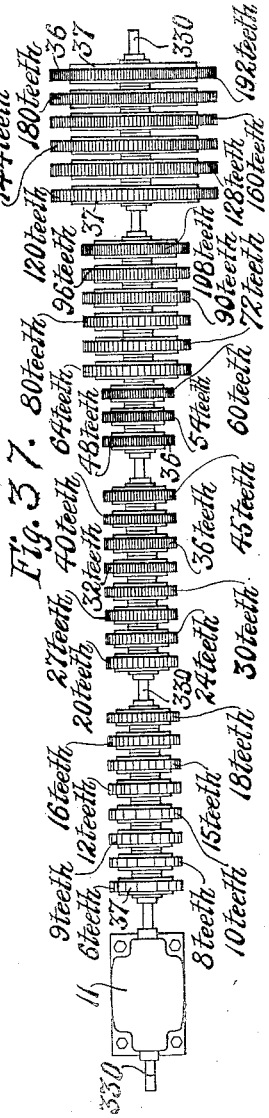

UNITED STATES PATENT OFFICE.

THADDEUS CAHILL, OF HOLYOKE, MASSACHUSETTS, ASSIGNOR, BY MESNE ASSIGNMENTS, TO ELLIS SPEAR, E. HILTON JACKSON, GEORGE F. CAHILL, ARTHUR T. CAHILL, AND THADDEUS CAHILL, TRUSTEES.

ART OF AND APPARATUS FOR GENERATING AND DISTRIBUTING MUSIC ELECTRICALLY.

1,213,803.     Specification of Letters Patent.     Patented Jan. 23, 1917.

Continuation of application Serial No. 43,944, filed January 19, 1901. Divided and application filed February 26, 1903, Serial No. 145,797. Renewed November 6, 1913, Serial No. 799,625. This application filed February 17, 1904, Serial No. 194,111. Renewed December 14, 1916. Serial No. 137,069.

*To all whom it may concern:*

Be it known that I, THADDEUS CAHILL, a citizen of the United States, residing at Holyoke, Massachusetts, have invented certain new and useful Improvements in the Art of and Apparatus for Generating and Distributing Music Electrically, of which the following is a specification.

This application is one of several divisions of original application No. 145,197, filed February 26, 1903.

The principal part of the subject matter of the present application was also clearly disclosed in a prior allowable application of mine, No. 43,944, filed January 19, 1901; and most of the claims asserted herein, if not all of them, either were asserted in the same words or in substance in said original application, No. 43,944, or might, under the law and the practice of the Patent Office, have been so asserted in said original application. In so far as the subject matter of the present application is identical with the subject matter of said original application, No. 43,944, filed January 19, 1901, this application is a continuation of said original application No. 43,944.

In Letters Patent of the United States to me No. 580,035, dated April 6, 1897, is described an art of and apparatus for generating and distributing music electrically.

My present invention consists in certain improvements in that art and in the apparatus for practising the same, which are hereinafter described, by means of which improvements certain new and useful effects are produced, which have never, so far as I am aware, been produced before. And, without attempting in this introductory portion of the specification any definition of the invention or any statement of claim, for which the reader is referred to the statement of claim at the end hereof, I would say, briefly and informally and by way of introductory explanation, that my present apparatus, hereinafter described, differs from the apparatus illustrated and described in the specification and drawings accompanying the Letters Patent aforesaid, in the following, among other particulars, namely;

First. In the apparatus illustrated in the drawings accompanying the specification of the Letters Patent aforesaid, a set of pitch-shafts is employed, corresponding respectively to the notes of a musical scale within the compass of an octave (twelve for the chromatic scale of equal temperament), each of said shafts giving movement to rotary vibration-generating devices for producing electrical vibrations corresponding to the successive octaves of that note of the scale to which such shaft corresponds, each of these shafts being connected by a belt of its own with a common driving-shaft from which they all receive movement. With this arrangement, the several octaves of a note were necessarily in tune with each other, for the rotary devices by which the electrical vibrations corresponding to them were produced were carried by the same shaft; but the vibration-generating devices corresponding to notes that were not octaves of each other were carried by different shafts and were liable on account of variations in the amounts of slip of the belts driving them to get out of tune, from time to time, more or less, thereby necessitating care and attention. In the specification aforesaid, the possibility of using toothed gearing for the pitch-shafts, thereby to avoid slip, was referred to. But no toothed gearing was illustrated in the drawings or described in the specification, for none suitable for the purpose had been contrived at that time. But a toothed gearing is illustrated in the accompanying drawing, by which all the pitch shafts are so connected together that it is impossible for the notes to get out of tune with one another; and everything is contrived in such a manner that the most perfect and unchangeable tuning of the notes with relation to one another is produced. Variations of the whole set from concert pitch are, of course, possible, but such variations do not affect the tuning of the notes with relation to one another nor the goodness of the chords, the tuning for which is more perfect and unchangeable than has ever been attained before in any musical instrument so far as I am aware.

Second. In the system described in the Letters Patent before mentioned, the electrical waves, as produced in the first instance by the vibration-generating devices, varied more or less widely from the sine-form and were then assimilated, in a greater or less degree, to the sine-form by successive inductive transfers, tone-purifying devices being used for that purpose. By my present invention, I preferably generate electrical waves that are nearly sinusoidal or at all events, that are so nearly free from the higher and harsher odd-numbered harmonics (or partial-tones) that they may be used for producing music electrically, without requiring the use of devices that serve merely or solely for tone-purifying.

Third. In the Letters Patent aforesaid, a form of vibration-translating device is described, having a wooden sound-board, set in vibration by a plurality of small electromagnets, receiving vibratory electrical currents from vibration generating devices. By my present invention, I use, preferably, as a vibration-translating device, in combination with the other parts of the apparatus, an electrically-vibrated diaphragm, preferably of soft iron or soft steel (in effect, a receiving telephone) in combination with a horn or other suitable reinforcing air-chamber. This form of vibration-translating device, particularly if the diaphragm be made (as I have been making them) of soft iron or steel, is quite free from alteration by the weather and produces sounds of a better quality and of greater power and through a wider range of pitch, and with less electrical energy than is required by the kind of vibration-translating device illustrated and described in the Letters Patent hereinbefore enumerated; and seems also more satisfactory in other particulars.

Fourth. In the apparatus hereinafter described, I provide independent or parallel circuits for the exciting coils of the several alternators and also I provide means for altering the intensity of excitation of the several alternators, each independently of the others. Thereby I make it possible to easily voice the instrument, so as to transmit over the mains the several series of vibrations, each with the power required; and make it possible also to compensate, in a measure, the tendency of the lines to transmit and of the diaphragms to produce some tones less strongly than others.

While I consider it convenient to use in the same apparatus all the improvements above referred to, I wish it to be clearly understood at the outset that one or more of those improvements may be used and the others not used or a portion of them may be used in one form of apparatus and another portion used in another and different form of apparatus.

For greater convenience, I shall first describe, with reference to the accompanying drawings, one form of apparatus for embodying my invention and by means of which it may be practised. After that one form has been made clear, I shall describe some of the more important of the many alterations and modifications that may be made.

Figure 19:
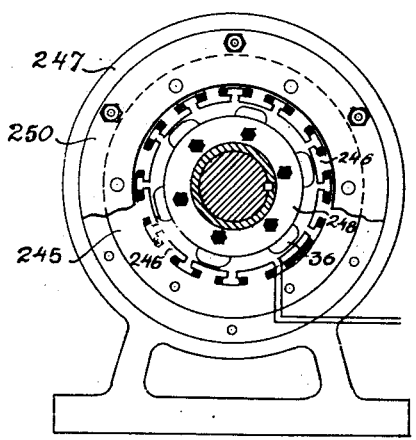
Figure 32:
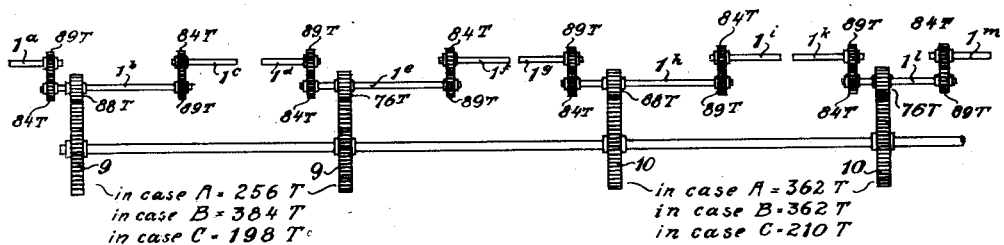

In the accompanying drawings, Figures 1 to 17 illustrate the form of apparatus that I shall first describe; while Figs. 18 to 37 illustrate some of the many possible modifications or alternative constructions. Fig. 1 is a schematic view, illustrating the electrical connections. Fig. 2 is a schematic view, partly in section, partly in elevation, showing a key of a keyboard and a circuit-closing device controlled by that key and serving, when that key is depressed, to throw the vibrations of the corresponding alternator upon the line. Fig. 3 is a sectional view in elevation, illustrating one of my vibration-translating devices. Fig. 4 is a detail view similar to Fig. 3, but on a larger scale; the most of the reinforcing horn being broken away. Fig. 5 is a detail, a plan view, on a larger scale than Fig. 4; the reinforcing horn, mouth-piece and diaphragm being removed. Fig. 6 is a view in general similar to Fig. 4, but illustrating a construction in which an electro-magnet, excited by a local battery, is used in place of the permanent magnet, illustrated in Fig. 4. Fig. 7 is a plan view, largely schematic, illustrating one of the arrangements of gearing that I have contrived for driving the twelve pitch-shafts, that correspond respectively to the twelve notes of the chromatic scale, each with the angular velocity required. Fig. 8 is a sectional view in elevation, illustrating one of the twelve pitch-shafts, shown in Fig. 7, with the alternators to which it gives movement. Fig. 9 is a detail sectional view in elevation, illustrating one shape of inductor tooth (out of many possible shapes) that may be used. Fig. 10, is a view similar to Fig. 8, but on a larger scale, and with the rotating parts in sections. Figs. 11, 12, 13, 14, 15, 16 and 17 are detail sectional views, partly in elevation, on the lines 11, 11; 12, 12; 13, 13; 14, 14; 15, 15; 16, 16; and 17, 17; respectively, Fig. 8, illustrating the characteristic differences of the several alternators respectively that are carried by a pitch-shaft, corresponding respectively to the successive octaves of that note of the scale to which such shaft corresponds and constructed to produce respectively 3, 6, 12, 24, 48, 96, and 192 cycles or complete electrical vibrations for each revolution of the pitch-shaft carrying them. In Figs. 11 and 12, the armatures and the exciting winding of the field-magnets 24, 24 and 25, 25, are omitted; and in Figs. 15, 16 and 17 much of each alternator is broken away. Fig. 12$^A$, is a detail view in sectional elevation and somewhat similar to Fig. 12, but illustrating the armature coils, and their supporting devices, which are omitted from Fig. 12. In Fig. 12^A, some of the parts are removed to expose others to view. Fig. 12^B, is a detail section on the line 12^B, 12^B, Fig. 12^A. Figs. 18 and 19 illustrate a modified arrangement of the alternators; Figs. 20 to 33 inclusive, are schematic views, illustrating modified or alternative arrangements of the gearing, for the alternators, adapted to the chromatic scale of equal temperament. Figs. 34, 35, 36 and 37 illustrate different arrangements of the gearing for the alternators, adapted to the diatonic scale of the natural or just intonation.

I have spoken of several of the figures above described as schematic views or as in part schematic. By a schematic view I mean a view illustrating certain essential features of a device, apparatus or arrangement of parts, in which, in order to illustrate the essential features more clearly, no effort is made to show the true sizes, proportions, relative distances and positions of the parts, or indeed, in many cases, their form. Such views are especially necessary in illustrating electrical circuits and apparatus. In most of the schematic views, if not in all, a few things of a kind are in some cases shown in illustration of all the things of that kind, for an attempt to illustrate all those things in one view would be impracticable, if not impossible, and would tend to obscure the clearness of the drawing.

In many of the views, whether schematic or geometric, a greater or less portion of the apparatus is broken away, as the break-lines indicate, or in some cases is omitted. Further, I have not endeavored to illustrate or describe all the minute details of construction of things old and well known, such for example, as alternators, inductoriums, switches and keyboard mechanisms, etc., but I have clearly illustrated and fully described those features of construction that are new with me and essential to the carrying out of the invention.

The schematic drawings, as before said, are of course not made to scale, and in the drawings that are made to scale different scales are of necessity used for different figures; but all that is new with me and essential to the invention is so clearly illustrated and so fully described that persons skilled in that part of the electrical art which relates to alternating currents and alternating current machinery and apparatus, can make a working machine from the information contained in this specification and in the accompanying drawings.

In the system illustrated in Figs. 1 to 17, which I shall first describe, there is a set of alternators, having vibration-frequencies corresponding respectively to the vibration-frequencies of the notes of a musical scale, through a sufficient range. Seven octaves, lacking one half-tone, are illustrated in the drawings, though, of course, a greater or less compass may be used, if desired.

In most of the drawings, I have illustrated this electrical system as adapted to the chromatic scale of equal temperament, which is now used almost universally throughout christendom; but it is to be understood that my invention is applicable also to other scales and temperaments. For the chromatic scale of equal temperament, then we have, or at least may have as illustrated in the drawings, 12 shafts, $1^a$, $1^b$, $1^c$, $1^d$, $1^e$, $1^f$, $1^g$, $1^h$, $1^i$, $1^k$, $1^l$, $1^m$, corresponding respectively to the twelve consecutive notes of the chromatic scale (as C, C-sharp or D-flat, D, D-sharp or E-flat, E, F, F-sharp or G-flat, G, G-sharp or A-flat, A, A-sharp or B-flat, and B,) and each carrying or giving movement to the alternators that serve to produce the successive octaves of the note to which such shaft corresponds and for which it serves. For convenience, we may term these shafts $1^a$, $1^b$, etc., pitch-shafts.

With the exact arrangement of parts illustrated in the drawings, and which it is to be understood, may be varied from, more or less required, each pitch-shaft gives movement to seven alternators, 2, 2, having vibration-frequencies corresponding respectively to the vibration-frequencies of successive octaves of the note for which the pitch-shaft carrying them stands. If the lowest in pitch of these alternators has a frequency of $n$ cycles per second, the other alternators, in the ascending scale, must have frequencies of $2n$, $4n$, $8n$, $16n$, $32n$, and $64n$, respectively; if the lowest of these alternators, 2, 2. produces, for example, 3 cycles or complete to-and-fro electrical vibrations per revolution, as illustrated in the drawings, the other alternators, carried by the same pitch-shaft, will produce, respectively 6, 12, 24, 48, 96, and 192 cycles or complete to-and-fro electrical vibrations for each revolution of such shaft.

The twelve pitch-shafts $1^a$, $1^b$, $1^c$, $1^d$, $1^e$, $1^f$, $1^g$, $1^h$, $1^i$, $1^k$, $1^l$, and $1^m$, with the sets of alternators carried by them, may be made to be exactly alike; that is, the alternators carried by any one of the twelve pitch-shafts may be in every respect exactly like the corresponding alternators carried by the other pitch-shafts; and for the sake of convenience of explanation (and for that reason only,) we shall first assume this exact similarity; in which case, to make the twelve pitch-shafts correspond respectively to the twelve notes of the chromatic scale, we drive those shafts with angular velocities corresponding respectively to the vibration-frequencies of the twelve notes of the chromatic scale. And when thus driven, the alternators carried by one of the twelve pitch-shafts will give the note C in its successive octaves; the alternators carried by another pitch-shaft will give the note C-sharp or D-flat of equal temperament in its successive octaves, while the other ten shafts will give each the successive octaves of the note of the chromatic scale to which such shaft corresponds.

*Of the gearing for the pitch-shafts.*— One form of gearing that I have contrived for this purpose, is illustrated schematically in Fig. 7; in which $1^a$, $1^b$, $1^c$, $1^d$, $1^e$, $1^f$, $1^g$, $1^h$, $1^i$, $1^k$, $1^l$, and $1^m$, are as before said, the twelve pitch-shafts, corresponding respectively to the twelve consecutive notes of the chromatic scale and each giving movement to the alternators that serve to produce the successive octaves of that note of the chromatic scale to which such pitch-shaft corresponds. Each of these pitch-shafts is mounted in suitable bearings, (preferably self-alining bearings with ring oilers) 5, 5, supported by the pedestals 6, 6, that rise from the bed plate 7, 7. This bed-plate at least in the case of large machines, is preferably made of a plurality of sections, as 7, 7, supported on masonry and firmly bolted together. The bed-plate 7, 7, the bearings 5, 5, and the pedestals 6, 6, form no part of my invention and are not illustrated in detail in the drawings. They appear to some extent in Figs. 8, 9, and 10, but the bearings and pedestals are entirely omitted from Fig. 7 and the other Figs. 20 to 33 which illustrate different arrangements of the gearing; and the bed-plate is omitted from most of these figures: and in all these figures the alternators carried by a pitch-shaft and which are clearly shown, so far as is essential to my invention, in Figs. 8 to 17 inclusive are omitted. The twelve pitch shafts, it will be seen, with the arrangement of gearing illustrated in Fig. 7 are arranged in four groups of three shafts each; and the three shafts of each group correspond to three consecutive notes of the chromatic scale. As the shafts are geared together in Fig. 7 movement applied to any one will move all. But the shaft 8, having at its opposite ends the toothed wheels 9 and 10, connects the four groups of pitch shafts before mentioned; so that it is convenient to drive said shaft 8; for which purpose the electrical motor, 11, may be used, with its armature mounted on and keyed to said shaft; or any other motor or driving mechanism whatever that is suitable for the purpose may be used. In Fig. 7, as also in all the other figures that illustrate modifications of the gearing, a reference numeral consisting of figures followed by the letter $^T$, indicates a gear-wheel having as many teeth as the number indicated by such figures. Thus $89^T$, applied as a reference numeral to a part, indicates that it is a gear-wheel having eighty-nine-teeth; $84^T$, a gear-wheel with 84 teeth; $37^T$ and $44^T$ respectively, gear-wheels of 37 teeth and 44 teeth, respectively, and so on.

The twelve pitch-shafts $1^a$, $1^b$, &c. are arranged as before said, in four groups of three shafts each, the three shafts of each group corresponding to three consecutive notes of the chromatic scale. The first group consists of the shafts $1^a$, $1^b$, and $1^c$; the second of the shafts $1^d$, $1^e$, and $1^f$; the third of the shafts $1^g$, $1^h$, and $1^i$; and the fourth group of the shafts $1^k$, $1^l$, and $1^m$. And in each of these groups, the lowest shaft (in pitch) of the group (the shaft $1^a$, in the first group; $1^d$ in the second; $1^g$ in the third; and $1^k$ in the fourth group) is connected with the middle shaft of its group, ($1^b$ in the first group; $1^e$, in the second; $1^h$, in the third; and $1^l$ in the fourth group) by a gear $89^T$, having 89 teeth, keyed fast to said lowest shaft $a$ and meshing with a gear $84^T$, having 84 teeth, keyed fast to the middle shaft of the same group; and the middle shaft of each group ($1^b$, $1^e$, $1^h$, or $1^l$ as aforesaid) is connected with the highest shaft (in pitch) of its group, (the shaft $1^c$, for the first group; $1^f$, for the second; $1^i$, for the third and $1^m$, for the fourth group) by a gear $89^T$, having 89 teeth, keyed fast to said middle shaft and meshing with a gear $84^T$, having 84 teeth, keyed fast to the highest shaft of the same group.

The shafts $1^a$, $1^b$, and $1^c$, constituting the first group are driven by means of a gear $88^T$, keyed fast to the shaft $1^b$, having 88 teeth, and meshing with the gear wheel 9 that is keyed to the shaft 8; while the shafts $1^d$, $1^e$, and $1^f$, constituting the second group, are driven by means of a gear $74^T$, having 74 teeth, keyed fast to the shaft $1^e$ and also meshing with the gear wheel 9. But the third group of shafts ($1^g$, $1^h$, and $1^i$) and the fourth group ($1^k$, $1^l$ and $1^m$) respectively, are driven by the wheel 10 keyed to the shaft 8 and meshing with the gear $88^T$ of 88 teeth, keyed fast to the shaft $1^h$ and the gear $74^T$ of 74 teeth, geared fast to the shaft $1^l$. Supposing the alternators carried by each of the twelve pitch-shafts $1^a$, $1^b$, $1^c$, $1^d$, $1^e$, $1^f$, $1^h$, $1^i$, $1^k$, $1^l$ and $1^m$ to be like (and in particular to produce the same numbers of cycles per revolution as) the corresponding alternators on each of the other pitch-shafts (in which case the only differences between the said twelve pitch-shafts, by which they are made to correspond respectively to twelve notes of the chromatic scale, consist in the different angular velocities with which they are respectively driven, a condition of things which we shall term "Case A," to distinguish it from the other cases hereinafter explained) the wheels 9 and 10 may have respectively 128 and 181 teeth, or any equal multiples thereof, as 256 and 362 teeth respectively. And if the shaft 8 be driven with a speed of 233 revolutions per minute, the 12 pitch-shafts, $1^a$, $1^b$, $1^c$, $1^d$, $1^e$, $1^f$, $1^g$, $1^h$ $1^i$, $1^k$, $1^l$, and $1^m$, will correspond respectively to the 12 consecutive notes of the chromatic scale founded on $c$; which makes the lowest note of the series of alternators before described the $c$ ($C^1$) of 32 vibrations per second, (which is the lowest $c$ of the pianoforte,) and the highest note, or at least the highest ground-tone, the $b$, seven octaves lacking one half tone above the $c$ last mentioned. If the speed of the shaft 8 be altered, the pitches of all the notes will be altered together, in exactly the same proportions. The builder or user can drive the machine at whatever speed, within its safe working limits, may best suit his purposes, and at whatever speed the shaft 8 may be driven, the twelve shafts $1^a$, $1^b$, $1^c$, $1^d$, $1^e$, $1^f$ $1^h$, $1^i$, $1^k$, $1^l$, and $1^m$ will, as before said, correspond respectively to the 12 consecutive notes of the chromatic scale; and the alternators 2, 2, (Figs. 8 to 17) carried by each such shaft, will produce the successive octaves of that note of the chromatic scale to which the pitch shaft carrying them corresponds.

Any variation in the angular velocity of the series of shafts will produce, as before said. a corresponding alteration in the pitch of all, but the relative pitches of the various alternators will remain fixed and unchangeable; for all the twelve shafts $1^a$, $1^b$, &c. are geared together in such a manner that no change can be made in the angular velocity of any one shaft without a corresponding change being made in the angular velocity of all the others. This fixed and unchangeable relation of the notes of any given chord, this impossibility of the notes getting out of tune with one another, without an actual breaking down of the machine, is, so far as I am aware, a new result, never attained before in any electrical music apparatus, nor so far as I am aware in any commercially useful or musically meritorious musical instrument.

Numerous alterations may be made in the arrangement of the shafts and gearing without departing from certain of the essential principles, combinations or subcombinations belonging to my invention. Some of these alterations and modifications will be described hereinafter.

*Of the alternators.*—We have already stated the relative vibration-frequencies of the various alternators 2, 2. Any kind of alternator whatever that is suitable for the purpose may be used. But whatever kind of alternator be used, it is important that the successive cycles of any given alternator be similar or at least that the periodic time of each wave be substantially the same as that of every other wave. For if the successive cycles of an alternator have materially unequal periodic times or if it generate simultaneously in its several armature coils, waves of unequal periodic times (which will happen if the pole pieces of such alternators as those illustrated in Figs. 11 and 12 or the teeth of the revolving inductors illustrated in Figs. 13 to 17 be unequally spaced) the effect upon the purity of the notes and especially upon the chords is liable to be disastrous. Inequalities may perhaps exist, so minute as not to be sensibly prejudicial, and possibly some special effects might be produced in special cases of inequalities (I affirm nothing on that point); but at least for all ordinary purposes, it is, according to my experience, a safe rule to make the pole pieces 24, 24, and 25, 25 in Figs. 8, 10, 11 and 12 as nearly as is conveniently possible of equal sizes and disposed equi-distant one from another. So also, while the different indicators illustrated in Figs. 8, 9, and 10, and 13 to 17 have preferably teeth of different sizes, each inductor, should in my judgment, to secure the best effect, have all its teeth as nearly as is conveniently possible of exactly equal size and exactly equi-distant one from another. To this, end I have cut the teeth of the inductors that I have used in a large and carefully built gear-cutting machine, provided with a very accurate indexing mechanism, and in particular having a large and very accurate worm-wheel and worm.

As I have before said, any form of alternator whatever that is suitable for the purpose may be used. But for divers practical reasons, which it is not necessary to enlarge upon here, I have found it convenient to use inductor alternators for the higher tones and a different form of alternators, in some cases at least, for the lower tones. Figs. 8 to 17 show one convenient arrangement of alternators (out of many possible ones) for producing the successive octaves of one of the notes of the scale.

21, 22, and 23 (Figs. 8, 10, 11 and 12) are turned disks of iron or steel (preferably steel castings or iron or steel forgings) to which the iron or steel pole-pieces 24, 24, belonging to the lowest or leftmost alternator, (Figs. 8 and 10) and 25, 25 belonging to the second alternator, Figs. 8 and 10, are suitably attached, as for example by the nuts 26, 26, and washers $26^a$, $26^a$. The pole pieces 24, carried by the disk 21, are exactly opposite the corresponding pole-pieces 24, carried by the disk 22; and the pole-pieces 25 carried by the disk 23 are exactly opposite the corresponding pole-pieces 25 carried by the disk 22. Exciting coils 27, 27, are wound upon the pole-pieces 24, 24 and similar coils 28. 28 are wound upon the pole-pieces 25, 25. The coils 27, 27, are connected together in series or in parallel (preferably in series) and have their opposite terminals connected to the insulated contact rings 29, 29, upon which the brushes 30, 30 bear, which are connected through a rheostat 12, Fig. 8, with the opposite poles of a direct current dynamo 31, or other suitable electric source. The exciting coils 28, 28, have their opposite terminals connected to similar insulated contact rings 29, 29, upon which other brushes bear, that are connected through a similar rheostat, 12, with the opposite poles of the exciting dynamo 31, before mentioned. In the air gap or space between the poles 24, 24, and 25, 25, lie the armature coils 32, 32, made preferably of insulated copper ribbon or strip, wound upon cores 32$^a$, 32$^a$, of vulcanite or other suitable insulating material. To give greater strength and stiffness to the coils 32, 32, the copper ribbon or strip out of which they are wound, and the external surface of the cores upon which they are wound, are preferably a little curved, as illustrated, for example, in section in Fig. 12$^B$. And to prevent the ribbon out of which the coil is wound from unwinding, the coil may be securely wrapped with binding wire at 32$^b$, as illustrated in Fig. 12$^A$, the binding wire being well insulated from the coil about which it is wrapped and being soldered together in the usual manner, to prevent it from unwrapping. Each of the coils 32 is firmly attached by a segmental clamp 33, to the stiff fixed ring 35; a bolt 34, passing through said clamp 33 and the core 32$^a$, and ring 35, with a tightening nut 34$^a$, by which the coil 32 is locked firmly in place. Pieces of hard fiber or other suitable insulating material, 32$^c$, and 32$^d$, (Figs. 12$^A$, and 12$^B$) are interposed between the coil 32 and the segmental clamp 33 and ring 35 respectively. The segmental clamp 33 is provided with two ears or lugs 33$^a$, 33$^a$, to engage the outer surface of the ring 35, and these lugs, with the bolt 34, hold the clamp 33 in place. The face of the ring 35 and these lugs, with the bolt 34, hold the clamp 33 in place. The ring 35 is preferably made of bronze, German silver or other non-magnetic material and is firmly bolted to the cast iron foot 35$^a$ which is in turn bolted to the bedplate 7.

The exciting coils 27 and 28 are wound in such a manner (a) that each of the poles 24, 25, on the disks 21 and 23 is of opposite polarity to the pole facing it on the disk 22, (b) that, advancing circumferentially, the successive poles 24, 24, are alternately of opposite polarity, while (c) all the pole-pieces 25 carried by the disk 22 are of one polarity and all the pole-pieces carried by the disk 23 are of the opposite polarity. In the drawings Figs. 8, 11, and 12, the differing polarities are indicated by the letters N, signifying north pole, and S, signifying south pole.

The purpose and the result of the arrangement described is that with every revolution of the pitchshaft carrying them, the six pairs of pole-pieces 24, 24 belonging to the leftmost alternator Figs. 8, and 10, produce three cycles or complete electrical vibrations, in the armature coils, 32, 32 that lie in the gap between said pole-pieces 24, 24, while the six pairs of pole-pieces 25, 25, belonging to the next adjacent alternator, produce just twice as many electrical vibrations per revolution in the armature coils 32, 32, that lie in the gap between said pole-pieces, 25, 25.

The armature-coils 32, 32, that lie in the gap between the pole-pieces 24, 24, are connected together into one series in such a manner, according to the known rules of the electrical art; that the voltage in one reinforces the voltage in another.

The general type of alternator just described having a disk armature, without iron, in the air-gap between opposite sets of pole pieces, may be used, if desired to produce some of the tones of the middle compass as well as the tones of lower range; the number of pole-pieces being doubled with each ascending octave. But in many cases if not in all, it will probably be found more convenient to use, for the tones of the middle as well as the higher compass, alternators having rotating iron armatures or inductors.

Figs. 8 to 10 and 13 to 17 illustrate one arrangement of inductor alternators for giving the higher octaves of the notes produced by the bass-generators, illustrated to the left of Figs. 8 and 10 and in Figs. 11, and 12 and already described. In each of these inductor-alternators there is (a) a rotating inductor 36, formed of thin plates of soft iron or steel, suitably insulated from each other, bolted together between the stiffening side plates 37, 37 and keyed to the shaft 1$^a$, or 1$^b$, etc., to rotate therewith; (b) a plurality of field poles 38, 38 of alternate north and south polarity, each having an exciting winding 39 wound about it, and a plurality of armature coils 40, 40, wound in slots formed in the polar face of the field pole, in immediate proximity to the rotating inductor 36; and (c) a suitable frame 43, preferably of annular internal shape, to which the pole-pieces 38, 38 are secured by the I-shaped keys 44, 44, shown in the drawings, or in any other suitable manner.

The stiffening side plates 37, 37, are separated from the iron or steel plates of the inductor 36, by annular plates or rings 37$^a$, 37$^a$, of German silver or other suitable non-magnetic material, to prevent or reduce to a minimum the production of Foucault or eddy currents in said plates 37, 37. To prevent the production of such currents in the shaft 1$^a$, 1$^b$, etc. a sleeve of German silver 37$^b$, is interposed between said shaft and each of the inductors 36, or said inductors may be mounted on spiders carried by said shaft.

The five inductors illustrated in Figs. 8, and 10, (and in detail respectively in Figs. 13, 14, 15, 16, and 17) have respectively 12, 24, 48, 96, and 192 teeth, and each of them makes as many complete electrical vibrations per revolution as it has teeth. For a given angular space there are, it will be observed, two armature teeth, on the field poles 38, Figs. 13, 14, 15, and 16, for each tooth of the inductor lying in the same angular space. The armature coils 40, 40, belonging to a single inductor, may be, and we shall suppose are, connected together in series, in such a manner that the voltage in each reinforces the voltage in the others. Thus, for example, the coils, surrounding the first, third, fifth and other odd numbered teeth of a given field pole should be wound in one direction and the similar coils surrounding the second, fourth, sixth and other even-numbered teeth of the same field pole, should be wound in the opposite direction. For as the magnetic flux increases in the first, third and fifth coils, it decreases in the second fourth and sixth coils, and vice versa. And the energizing coils 39, 39 upon the field poles 38, 38, surrounding any given inductor 36, are connected and wound in such a manner that the current flows around the adjacent field poles 38, 38, in opposite directions, so that these field poles are alternately of opposite sign; each north pole having a south pole on each side of it and each south pole, a north pole on each side of it.

Except in very large machines, the inductors 36, 36 Figs. 15, 16, and 17 must have small teeth. To avoid the difficulty of winding these small teeth, each with its own coil, as illustrated in Figs. 13 and 14, we may pass a single insulated conductor, as in Fig. 15 (or a plurality of such conductors) forward through one armature slot between two contiguous teeth and backward through the next adjacent slot—passing the winding forward through the first, third, fifth, seventh slots etc., and backward through the second, fourth, sixth, eighth slots etc., or we may arrange the teeth in groups and wind a single coil on each such group; the groups being preferably arranged in such a manner that the total magnetic flux through a given field pole 38 remains constant. One arrangement for this purpose is illustrated in Fig. 17, in which the several groups of teeth, formed upon a given field-pole 38, it will be observed are so placed with relation to each other and with relation to the teeth of the corresponding inductor 36, that when the magnetic flux increases in the teeth of the first, third and fifth, etc., groups it decreases in the teeth of the second, fourth and sixth, etc., groups and vice versa. The coils wound about the stems of the teeth of the first, third and fifth, etc., groups, should therefore be wound in one direction, while the similar coils wound about the stems of the teeth of the second, fourth and sixth, etc., groups should be wound in the opposite direction.

Figs. 8 to 17 illustrate the alternators that may be used for producing the successive octaves of a single note of the chromatic scale, and which successive octaves have vibration frequencies of $n$, $2n$, $4n$, $8n$, $16n$, $32n$ and $64n$ respectively. For each of the other 11 notes of the chromatic scale, a similar set of alternators may be used, the twelve similar sets of alternators carried by the twelve pitch-shafts $1^a$, $1^b$, etc., being made to give each its appropriate note by the different angular velocities with which said shafts are driven by suitable gearing, as, for example that illustrated in Fig. 7, and already described.

*Of the electrical circuits.*—We are now in a position to explain the electrical circuits. Let us first consider the schematic views, Figs. 1 and 2; 2, 2 are the ground-tone alternators before described as mounted on the twelve pitch shafts $1^a$, $1^b$, etc., (Figs. 7 and 8 to 17) and having vibration-frequencies corresponding, respectively to consecutive notes of a musical scale; the several alternators on any given shaft having vibration frequencies standing to each other as 1, 2, 4, 8, 16, 32 and 64, respectively and with the construction illustrated in Figs. 8, 10, and 11, to 17, producing, respectively 3, 6, 12, 24, 48, 96 and 192 cycles per revolution of the pitch-shaft carrying them; and the twelve pitch-shafts $1^a$, $1^b$, etc., having as before described, angular velocities corresponding, respectively, to the vibration-frequencies of the twelve notes of the chromatic scale in equal temperament. The result of this arrangement is that the seven alternators 2, 2, (Figs. 8, 10, and 11 to 17) produce the seven successive octaves of that note of the chromatic scale to which the pitch-shaft carrying them corresponds and for which it serves. Thus the seven alternators (Figs. 8, 10, and 11 to 17) carried by the pitch-shaft corresponding to $c$ produce, respectively, the seven octaves of $c$; the seven similar alternators carried by the pitch-shaft corresponding to c-sharp produce, respectively, the seven octaves of c-sharp; and so on with the other ten shafts. While the twelve alternators of the kind illustrated in Fig. 11, carried by the twelve pitch-shafts $1^a$, $1^b$, etc., respectively produce the lowest twelve half-tones or lowest octave of the instrument; the twelve alternators of the kind illustrated in Fig. 12, carried by the twelve pitch-shafts, respectively, produce the next twelve half-tones or second octave, in the ascending scale; the twelve alternators like Fig. 13, the third octave; the twelve alternators, like Fig. 14, the fourth octave; the twelve alternators of the kind illustrated in Fig. 15, the fifth octave; the twelve alternators like that illustrated in Fig. 16 the sixth octave, in the ascending scale; while, finally, the twelve alternators like that illustrated in Fig. 17, and carried by the twelve pitch-shafts, respectively, produce the next twelve half-tones or seventh octave, in the ascending scale.

Returning to the schematic views, Figs. 1, and 2, 45 45, are the keys at the keyboard centered at 46 on the bar 47, and which are preferably arranged like the keys of a pianoforte or organ, though of course it is to be understood that any other suitable arrangement of keys, or of switches, or of circuit-controlling devices may be used instead. For greater convenience of construction, each of the alternators 2, 2, has one pole connected with the common-return wire 48, while the other pole is connected with a contact spring 49, which is attached by a screw 50, or in any other suitable manner, to the insulating bar 51. Each of the contact springs 49 carries a platinum contact point 52, which makes contact, when the corresponding key 45 is depressed with a similar contact point set in the screw 53; which latter is adjustable by a locknut in the metal bar 54.

The effect of the arrangement described is such that if any key 45 of the keyboard be depressed, the alternator whose vibration-frequency is identical with that of the note for which such key stands, has its circuit closed through the contact-spring 49, controlled by such key depressed, the screw 53, corresponding to such spring, the metal bar 54, in which such screw is set, the line wires or mains 68 and 69 and the vibration-translating devices 70, 70, which may be located in places miles apart, and by which the electrical vibrations are converted into audible aerial vibrations. If a plurality of keys be depressed simultaneously, the alternators corresponding to those keys act, each in the manner already described, to produce its appropriate note in the vibration translating devices 70, 70.

*Of the vibration-translating devices.*— Any kind of vibration-receiving or vibration-translating device whatever that is suitable for the purpose may be used for translating the electrical vibrations, produced in the manner above described, into audible aerial vibrations, or for producing in any suitable manner audible vibrations by means of the electrical vibrations. Any good receiving telephone, of the kind used in ordinary telephony will, if connected across the mains 68 and 69, produce some effect in translating the electrical vibrations into audible vibrations, but whether the effect be greater or less will depend much upon the receiving telephone that is used. The best device, however, that I have found for the purpose is that illustrated in the drawings. Each vibration-translating device 70, 70, in the schematic views, consists of a horn 74 (Figs. 3 to 6) closed at one end by a telephone diaphragm 75, which is vibrated by the action of the undulatory electric currents passing from the lines or mains 68, 69, through the coils 76, that are wound about the poles or the polar extensions of the usual field-magnet 77. The diaphragm 75 and the magnet 77 are, for greater convenience, contained in and secured to the usual cylindrical case 78 whose mouthpiece 79 screws down upon it in the usual manner, to clamp the diaphragm 75 in position. The mouth-piece 79 is furnished with a cylindrical extension, 79$^a$, into which the small end of the horn 74 is fitted. I have used a diaphragm of the size usually employed in telephone receivers, having an extreme diameter of two and three-sixteenths ($2\frac{3}{16}$) inches, the diameter of the portion free to vibrate being one and fifteen-sixteenths ($1\frac{15}{16}$) inches. I have found a thin diaphragm of the above diameter and of about one-hundredth of an inch thickness more satisfactory particularly for the lower notes, than a diaphragm of greater thickness. I have used horns of metal and horns of wood of varying lengths from thirty inches to eight feet and I think there is no doubt that either longer or shorter horns may be used. I have found the effect from a brass horn somewhat brighter than that from a wooden horn; and have found, particularly for the lower notes, a horn five or six feet long more satisfactory than a horn thirty inches long. I have also found a telephone with pole-pieces one sixteenth ($\frac{1}{16}$) of an inch thick, measured on the line $x\ x$, Fig. 5, preferable to one with pole-pieces one eighth ($\frac{1}{8}$) of an inch thick, measured on that line. I do not mention these various details as indispensably necessary, but I have found them advantageous in obtaining satisfactory results and therefore mention them for what they are worth, be that more or less. Under altered circumstances they may perhaps be wholly unimportant.

Instead of using a permanent steel magnet as in Figs. 3 and 4, an electro-magnet might doubtless be used, supplied with the usual coils 76 on its polar terminals, to receive current from the lines or mains 68, 69, and with exciting coils 80, 80, wound about its cores 81, and supplied with current by a local battery 82, for example, as illustrated in Fig. 6.

The telephonic receiver may, of course, be used entirely apart from the horn 74, but the effect, so far as my experience has extended is much less satisfactory. Under altered circumstances, however, supposing an improved arrangement of the magnet and diaphragm, if any such can be made, possibly the horn 74 may be found much less important than it is with the diaphragms and magnets that I have been using. Finally the wave-form of any given alternator, if it be not strictly sinusoidal, is more or less altered in transmission from its source to the vibration-translating devices 70, 70. The general effect, of this alteration consists in a suppression of the higher components of the wave to a greater extent than the lower components. Thus the waves of electric current vibrating through the coils 76 (Figs. 3 and 4) of the receiving telephones, may be much more nearly sinusoidal than the waves of impressed voltage in the alternators producing them. But by generating sinusoidal waves in the first instance, the need for tone-purifying is eliminated and the loss of power that it involves prevented. Whatever the nature of the waves produced by an alternator may be, the distributed capacity of a long line or cable tends to alter any complex wave-form more or less, suppressing the higher components of the wave to a greater extent than the lower components. This difficulty, however, should not with good lines be so serious as to prevent the practical distribution of electrical music, produced in the manner hereinbefore described, to considerable distances from a central station. It has been distributed by my system over a metallic circuit more than a hundred miles in length and which included several miles of cable, producing under these circumstances. sounds almost as loud as those produced by an orchestra. Finally, the difficulties just mentioned in respect of alteration of the wave-form of the impressed vibrations by a distributed capacity of a long line or cable, are not practically by any means so serious in distributing music generated electrically, with an instrument such as that hereinbefore described, as in distributing music electrically by means of microphones. First, for the reason that the currents produced by the alternators hereinbefore described are enormously more powerful than any currents that a microphone can handle; and, second, because by means of the rheostats 12, 12, each alternator can be given such a voltage as is required to put its vibrations over the line with the requisite power relative to the vibrations of the other alternators.

*Of modified and alternative alternators.*—Instead of using the forms of alternators illustrated in Figs. 8, to 17, and before described, any other kind of alternator that is suitable for the purpose may be used. But if we use alternators with rotating toothed inductors, we may, instead of using field-poles circumferentially arranged, of alternately north and south polarity, and having armature coils wound upon their teeth (as illustrated in Figs. 13 and 17 inclusive) arrange the rotating toothed inductors in pairs, with an armature ring built up of thin sheets of soft iron or steel surrounding each inductor and an annular yoke connecting such armature rings and a single exciting coil located between the two armature rings, or between the two inductors, and surrounding the rotating shaft to which said two inductors are secured. One illustration of this construction is given in Figs. 18 and 19, which illustrates six alternators forming a ground-tone set, though the principle is of course the same whether applied to the ground-tone set or alternators or to one or both of the supplemental sets, the only necessary difference being in the number of teeth in the several inductors and in the armature rings surrounding them which number of teeth (where all the alternators corresponding to the different octaves of a note are mounted upon the same shaft) may be as already explained in connection with Figs. 8, to 17 inclusive, being of course more numerous for the alternators of the supplemental sets than for the corresponding alternators of the ground-tone sets. Also, with the construction illustrated in Figs. 18 and 19, the alternators are arranged in pairs, so that there should be an even number of them on a shaft.

Figure 18:
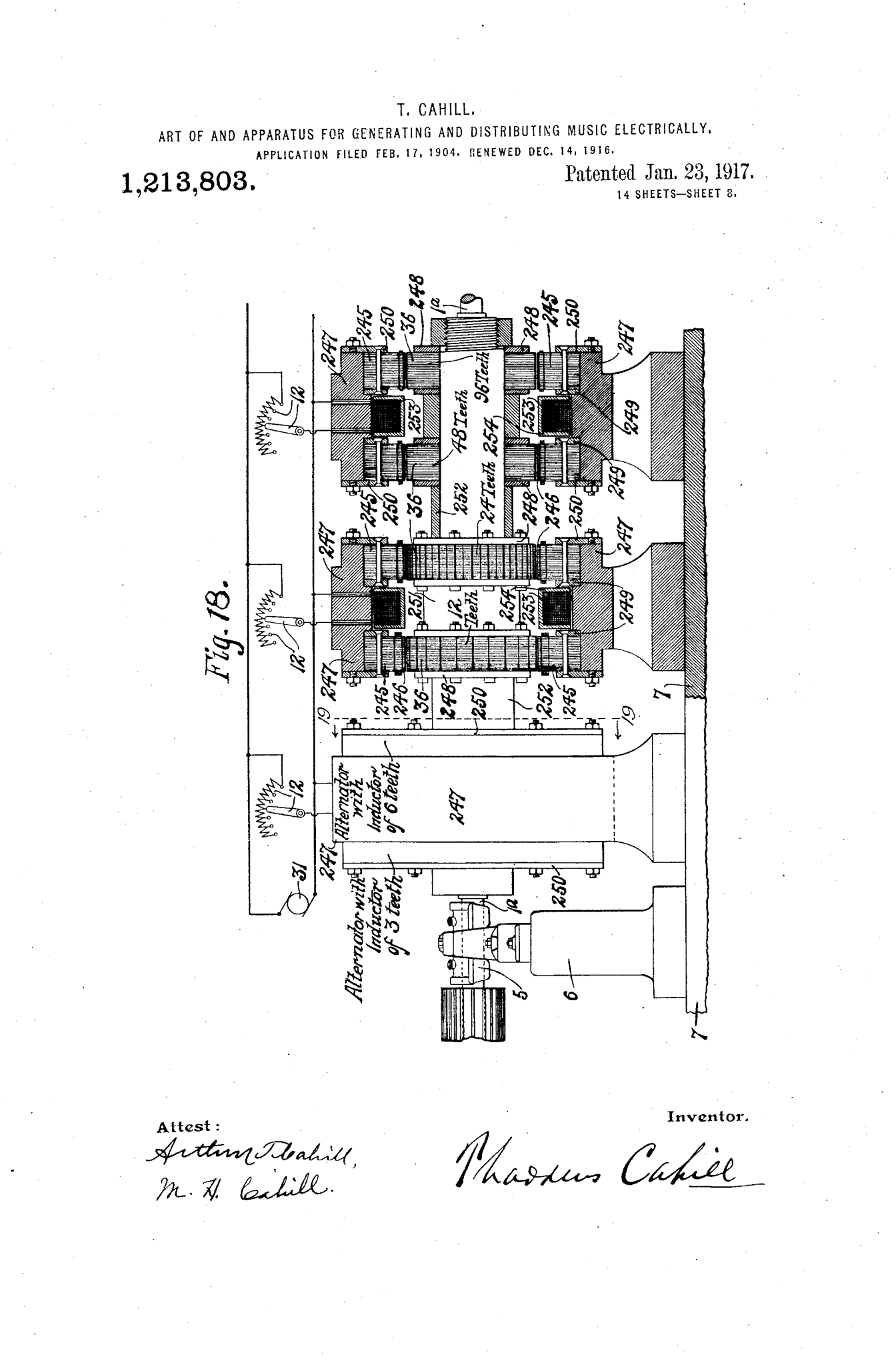

Fig. 18, is a view partly in section, partly in elevation. The two leftmost alternators, whose rotating inductors have 3 teeth and 6 teeth respectively, are shown in elevation; the next two alternators are shown with their annular frame, armature rings and energizing coil in section and the inductors in elevation, while with the two rightmost alternators the inductors also are shown in section. Fig. 19, is a transverse section on the line 19—19, Fig. 18. 1ᵃ is the pitch-shaft and 36, 36, are the rotating inductors which, supposing the one of lowest frequency to have three teeth, should have 3, 6, 12, 24, 48, and 96 teeth respectively. 245, 245, are the armature rings surrounding each its own inductor, and each having preferably twice as many teeth as the corresponding inductor (see Fig. 19) subject to the qualification that where the teeth are very small on the inductors of high frequency, the construction illustrated in Fig. 17, as applied to the teeth formed upon the field-poles 38, 38, may be applied to the corresponding teeth formed upon the rings 245, 245. The coils on adjacent teeth 246, 246, of an armature ring 245, are oppositely wound because the magnetic flux increases in one tooth as it decreases in the next adjacent tooth, and vice versa. 247 is the annular yoke-piece which may be shaped as shown in the drawing, Figs. 18 and 19 and bolted firmly to the bedplate. It may be made of cast iron or steel. Stiffening side rings 248, 248, are riveted to the rotating inductors, and similar rings 249 and 250 are riveted to the armature rings 245, the outer ring 250 being extended radially so that it may be bolted to the annular yoke piece 247. Sleeves of wrought iron or mild steel 251, 252, are placed on the pitch-shaft between the inductors 36, 36, to hold them the proper distance apart, and also in the case of the sleeves 251, to give additional cross-section to the magnetic circuit. This circuit is created by the action of the currents in the exciting coil 253 wound on the spool 254. The lines of force or of magnetic flux, created by this coil, may be supposed to flow through the shaft $1^a$ outward through one of the inductors 36, and across the air-gap to the armature ring, 245, corresponding to such inductor, thence, through the annular yoke piece 247 and through the other armature ring 245 of the same pair, and thence inward across the air-gap to the rotating inductor 36 corresponding to it, and so back into the shaft $1^a$.

The several exciting coils 253, 253, are connected, each through its own regulating rheostat 12, with the direct-current exciting dynamo 31, before described.

Many other forms of alternators are known and in common use. I have invented neither the alternator itself nor any improvement in the alternator, considered by itself alone. My invention, so far as the alternators are concerned, relates not to the individual unit, but to the combination of units, having the requisite frequencies, with the toothed gearing and with the various expression devices and other improvements, described in this specification. Such being the case, it will be understood that any other alternators that are suitable for the purpose may be used instead of those before described.

I consider alternators to be the best and most satisfactory means of producing electrical vibrations for producing music. I was once of the opinion that the simplicity and cheapness of a rheotome device made it in general preferable to an alternator, but my present opinion is in favor of the alternator.

Figure 33:
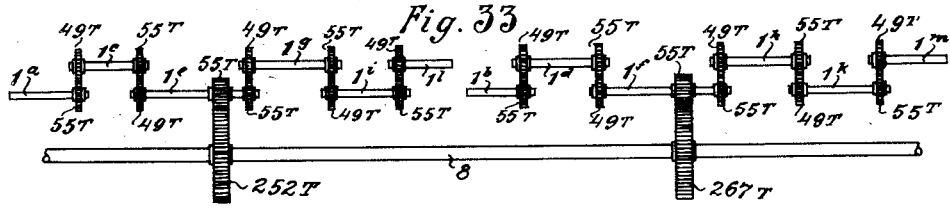

The positive gearing hereinbefore described and illustrated for example in Figs. 7 and 20 and 33, may obviously be used for rotatory rheotomes as well as for alternators.

*Of modified and alternative arrangements of the gearing.*

For simplicity's sake and for that reason only, we have thus far supposed the twelve pitch-shafts in Fig. 7 with the alternators carried by them, to be each exactly like the pitch-shaft and alternators illustrated in Figs. 8 to 17, the differences in pitch of the several shafts being made solely by the differences in the angular velocities with which they are respectively driven. Such an arrangement may be used. It involves, however, very considerable differences in the angular velocities of the shafts which it is desirable to reduce. But by constructing the alternators driven by some of the pitch-shafts so that they produce a certain number of cycles per revolution, and constructing the corresponding alternators carried by other pitch-shafts so that they produce a different number of cycles per revolution in other words, by making the alternators carried by some pitch-shafts to differ in the number of their teeth or pole-pieces, as well as in their angular velocities, from the corresponding alternators carried by other pitch-shafts, the extreme difference in angular velocities of the several pitch shafts can be greatly reduced. For example, we may make the alternators carried by the pitch shafts $1^g$, $1^h$, $1^i$, $1^k$, $1^l$, and $1^m$ to have one and one-half ($1\frac{1}{2}$) times as many revolving pole-pieces or inductor-teeth as the corresponding alternators carried by the pitch-shafts $1^a$, $1^b$, $1^c$, $1^d$, $1^e$, and $1^f$, the alternators carried by the pitch shafts first mentioned having, for example the numbers of pole-pieces or of teeth illustrated in Figs. 8 to 19; or inclusive and before described, and the corresponding alternators carried by the pitch-shafts $1^a$, $1^b$, $1^c$, $1^d$, $1^e$, and $1^f$, having each but two-thirds ($\frac{2}{3}$) as many rotating pole pieces or inductor-teeth as the corresponding alternator illustrated in Figs. 8 to 17 or giving to the alternators carried by the pitch-shafts $1^a$, $1^b$, $1^c$, $1^d$, $1^e$, and $1^f$, the same numbers of rotating pole-pieces and inductor teeth as the alternators that are illustrated in Figs. 8 to 17, we may give exactly one-third more rotating pole-pieces or inductor-teeth to the corresponding alternators that receive movement from the pitch-shafts, $1^g$, $1^h$, $1^i$, $1^k$, $1^l$, and $1^m$. We may, then, for convenience sake, take these three cases as typical namely:

*Case A.*—The alternators carried by each of the twelve pitch-shafts have exactly the same cyclical frequencies as the corresponding alternators carried by the other pitch-shafts and the alternators carried by the twelve pitch-shafts are made to correspond respectively to the successive octaves of the twelve notes of the chromatic scale by giving to the twelve pitch-shafts angular velocities having the same or substantially the same numerical ratios as the vibration-frequencies of the twelve notes of the chromatic scale within the compass of an octave.

*Case B.*—The alternators carried by the six pitch-shafts $1^g$, $1^h$, $1^i$, $1^k$, $1^l$, and $1^m$, are constructed to produce once and one-half (1½) times as many cycles per revolution as the corresponding alternators carried by the pitch-shafts 1ᵃ, 1ᵇ, 1ᶜ, 1ᵈ, 1ᵉ, 1ᶠ.

*Case C.*—The alternators carried by the six pitch-shafts 1ᵍ, 1ʰ, 1ⁱ, 1ᵏ, 1ˡ, and 1ᵐ, are constructed to produce one-third more cycles per revolution than the corresponding alternators carried by the pitch-shafts 1ᵃ, 1ᵇ, 1ᶜ, 1ᵈ, 1ᵉ, and 1ᶠ.

These three cases are typical and will be referred to hereinafter as Case A, Case B, and Case C, respectively. Many other cases might, of course, be put, which there is not space to discuss. Cases A, B, and C, are sufficient to illustrate the subject. I consider Case B, and Case C, as preferable constructions to Case A for large machines if not for all machines. If we use the gearing illustrated in Fig. 7 the wheels 9 and 10 in Case A may have, respectively 128, and 181 teeth, or some equal multiples thereof, as 256 and 362; in Case B, they may have 192 and 181 teeth respectively, or some equal multiples thereof, as 384 and 362 teeth, respectively, in Case C they may have preferably some equal multiples of 33 and 35, respectively, as for example 198 teeth for the wheel 9 and 210 for the wheel 10.

Another form of gearing is illustrated in Fig. 20. In this figure, as also in Figs. 7 and 21 to 37, inclusive a reference-numeral consisting of figures followed by the letter ᵀ, indicates a gear wheel, having as many teeth as the number indicated by the figures. Thus "89ᵀ" applied to a part, indicates that it is a gear wheel having 89 teeth; 49ᵀ, a gear wheel of 49 teeth, 55ᵀ, a gear wheel of 55 teeth, and so on; such gear wheel being in each case keyed to the shaft carrying it. 1ᵃ, 1ᵇ, 1ᶜ, 1ᵈ, 1ᵉ, 1ᶠ, 1ᵍ, 1ʰ, 1ⁱ, 1ᵏ, 1ˡ, and 1ᵐ, Fig. 20, are the twelve pitch-shafts corresponding respectively to the twelve consecutive notes of the chromatic scale of equal temperament and which serve each to give movement to the alternators (see for example Figs. 8 to 17 or Figs. 18 and 19) that produce the successive octaves of the note to which it corresponds. Remembering these two facts, and remembering also, what is meant by Case A, Case B, and Case C, as above explained Fig. 20, and most of the figures following, illustrating gearing, are so plain upon the face of the drawing that verbal explanation can add nothing to them, and will be given only as to special points or comparative features, etc.

The adjacent shafts of a group correspond in Fig. 7 to notes of the chromatic scale a semitone apart, and in Fig. 20, to notes of the chromatic scale a whole tone apart.

Fig. 21, illustrates an arrangement of gearing in which the twelve pitch-shafts are arranged in three groups, the adjacent shafts in each group corresponding to notes of the chromatic scale, a minor third (or three half-tones) apart.

Subject to the qualification already pointed out, that we must not, according to the size of the machine, unduly diminish the distance between the main driving-shaft 8 and the pitch-shafts as 1ᵃ, 1ᵇ, etc., the wheels 320ᵀ, 356ᵀ, and 220ᵀ, keyed to the shaft 8, Fig. 21, may have only three-fourths or one-half or even one-fourth as many teeth as they now have. The exact arrangement of the gearing and tooth-numbers in Fig. 21 is for Case A, before described. For Case B, each of the three groups of pitch-shafts may be modified by substituting for the gear 74ᵀ, of seventy-four teeth, on the third shaft (1ᵍ, or 1ʰ, or 1ⁱ,) of the group, a gear having one hundred and eleven teeth. To adapt the gearing illustrated in Fig. 21 to Case C, described above, we have only to substitute for the gear 88ᵀ, of eighty-eight teeth, on the shafts 1ᵈ, 1ᵉ, and 1ᶠ, a similar gear, having sixty-six (66) teeth to mesh with the gear 74ᵀ, of seventy-four (74) teeth on the next higher shaft (1ᵍ, 1ʰ, or 1ⁱ.)

Fig. 22, illustrates another arrangement of gearing, in which the pitch-shafts 1ᵃ, 1ᵇ, 1ᶜ, 1ᵈ, 1ᵉ, and 1ᶠ, are driven by gears keyed to the shaft 8, while the pitch-shafts 1ᵍ, 1ʰ, 1ⁱ, 1ᵏ, 1ˡ, and 1ᵐ, are driven by gears keyed to the supplemental shaft 8ᵃ. The shaft 8 is connected with the shaft 8ᵃ, by means of a gear 300 keyed to the shaft 8 and meshing with a gear 300ᵃ, keyed to the shaft 8ᵃ. For the arrangement of alternators before described as "Case A" the wheels 300 and 300ᵃ, should have 181 and 128 teeth, respectively, or some equal multiples thereof, as for example 362, and 256 teeth, respectively. For Case B, said wheels 300 and 300ᵃ, should have 181 and 192 teeth, respectively or some equal multiple thereof, as for example 362 and 384 teeth, respectively. And for Case C, before described, the wheels 300 and 300ᵃ, may have 210 and 198 teeth, respectively, or any other numbers of teeth that are equal multiples of 35 and 33 respectively.

Giving to the several gears in Fig. 22, respectively the numbers of teeth indicated on the drawing and before described, the shafts 8 and 8ᵃ respectively, have just one-fourth the angular velocities of the shafts 1ᵈ, and 1ᵏ, respectively. We may, without altering the number of teeth in the gears keyed to the shafts 1ᵃ, 1ᵇ, 1ᶜ, 1ᵈ, 1ᵉ, 1ᶠ, 1ᵍ, 1ʰ, 1ⁱ, 1ᵏ, 1ˡ, and 1ᵐ reduce the numbers of teeth in all the gears (except gears 300 and 300ᵃ) carried by the shafts 8 and 8ᵃ, Fig. 22 to three-quarters (¾) or to one-half (½) or even to one-fourth (¼) the numbers marked on the drawing and before described, subject to the qualification (which in many cases would prevent any such reduction) that we must not make the gears on the shafts 8 and 8ᵃ so small as to bring the pitch-shafts as $1^a$, $1^b$, $1^g$, $1^h$, etc., so close to the shafts 8 and $8^a$, as not to leave sufficient room for the alternators carried by said pitch-shafts.

By using bevel gears, the number of teeth in the driving gears on the shafts 8 and $8^a$ that mesh with the wheels $44^T$, $55^T$, $89^T$, $80^T$, $84^T$, and $49^T$, respectively, may be made to be, respectively 37, 49, 84, 80, 89 and 55 respectively, as is indicated in Fig. 23; or they may be made to be equal multiples of these numbers, the numbers of teeth, in the driving gears on the shafts 8 and $8^a$ (that mesh with the gears on the twelve pitch-shafts $1^a$, $1^b$, etc.,) being all multiplied, in such case, by the same number as 2, 3, 4, etc.

In Fig. 23, it will be observed, the angular velocity of the shafts 8 and $8^a$ are identical respectively with the angular velocities of the shafts $1^d$, and $1^k$, and in Fig. 22, in which the gears on the driving shafts 8 and $8^a$ have each four times as many teeth as the corresponding gears on said shafts 8 and $8^a$, in Fig. 23, said shafts 8 and $8^a$ have exactly one-fourth the angular velocities of the shafts $1^d$, and $1^k$, respectively. The essential thing is the relative angular velocities given to the twelve pitch-shafts $1^a$, $1^b$, $1^c$, $1^d$, $1^e$, $1^f$, $1^g$, $1^h$, $1^i$, $1^k$, $1^l$, and $1^m$. Numerous variations of the gearing may be made so long as the relative angular velocities of the twelve pitch-shafts are kept the same or substantially the same as illustrated in Figs. 20, or 21, or 22, and Fig. 24 illustrates one of the many possible variations. The twelve gears keyed respectively to the twelve pitch-shafts and the twelve gears on the shafts 8 and $8^a$ meshing with them may have respectively the numbers of teeth indicated in Fig. 24.

For Cases A, B, and C, before described the wheels 300 and $300^a$, Figs. 23 and 24, may have the respective numbers of teeth before described in connection with Fig. 22.

Instead of using the two shafts 8 and $8^a$ we may drive each of the twelve pitch-shafts directly from a single shaft 8. One such arrangement, out of many possible ones, is illustrated in Fig. 25, as adapted to Case A, before described. By altering the number of teeth in the gears, however, gearing like that of Fig. 25, having a single driving-shaft connected directly with each of the twelve pitch-shafts may be used in Cases B and C, before described. Fig. 26, shows such a modification adapted to Case C, before described.

I consider it preferable to run the driving-shaft 8 (or the driving-shafts 8 and $8^a$) at a much slower speed than the pitch-shafts $1^a$, $1^b$, etc., and to connect the driving shaft or driving shafts with the pitch-shafts by means of large spur-gears on the driving shaft or driving shafts, as illustrated, for example, (in Figs. 7, 20, 21, 22, and 25) particularly is this necessary, at least in a large machine, in order to separate the pitch-shafts $1^a$, $1^b$, etc., carrying the inductors or armatures, a sufficient distance from the main driving shaft 8 or $8^a$ without using such large gears on the pitch-shafts as would involve excessive peripheral velocities for the gears. With bevel gearing this objection does not apply. Also, it may be obviated by using an intermediate gear, or "idlewheel" between the driving gear on the shaft 8, or $8^a$, and the driven gear on the pitch shaft. But it is desirable to avoid all such complications and, in any case, I consider it in general preferable to drive the main shaft 8 at a lower speed than the pitch-shafts $1^a$, $1^b$, etc. Assuming, however, that the groups of alternators carried by the twelve pitch-shafts are alike that is, that the alternators of one group have the same cyclical frequencies per revolution as the corresponding alternators in each of the other groups so that said pitch-shafts are made to correspond respectively to the twelve notes of the chromatic scale, by driving them with angular velocities corresponding to the vibration-frequencies of the twelve notes of the chromatic scale; and assuming, also, that the pitch-shaft $1^a$, is to be driven with the same angular velocity as the main driving shaft, 8, then the gear on said pitch-shaft $1^a$, should have the same number of teeth as the gear on the driving shaft with which it meshes and by which it is driven, and the numbers of teeth respectively, of the driving gear on the main shaft 8 and of the intermeshing driven gear on the pitch-shaft $1^b$, $1^c$, etc., for each of the other eleven notes of the chromatic scale may be as follows, the number of teeth of the gear on the driving shaft being first given, in each case namely: for the shaft $1^b$, 89 and 84; for the shaft $1^c$, 110 and 98; for the shaft $1^d$, 88 and 74; for the shaft $1^e$, 247 and 196, or less perfectly in respect of equal temperament tuning, 121 and 96, or still less perfectly 87 and 69. For the shaft $1^f$, 295 and 221, or less perfectly for equal temperament tuning 120 and 90. For the shaft $1^g$, 181 and 128; for the shaft $1^h$, 120 and 80; for the shaft $1^i$, 127 and 80; for the shaft $1^k$, 111 and 66; for the shaft $1^l$, 114 and 64; for the shaft $1^m$, 168 and 89.

The notes of the alternators carried by the shaft $1^h$, in the table just given are a little sharp (about one-fiftieth of a semitone) for equal temperament. A wheel of 442 teeth, on the driving-shaft, meshing with a wheel of 295 teeth on the shaft $1^h$, would give almost mathematically perfect equal temperament tuning to said shaft $1^h$; but such large numbers of teeth on rapidly moving wheels are subject to great, if not practically insuperable, objections. In a high-speed machine, the numbers of teeth first given in the above table for the gears for the shafts $1^e$. and $1^f$, are so large as to be objectionable, and in any such case the numbers of teeth next given in said table for said gears may be used instead.

Instead of driving all the pitch-shafts, each directly from one common driving shaft as in Figs. 7, 20 and 21, we may connect the twelve pitch-shafts together in series. One arrangement of gearing for this purpose is illustrated in Fig. 27, in which each of the twelve pitch-shafts $1^a$, $1^b$, $1^c$, $1^d$, $1^e$, $1^f$, $1^g$, $1^h$, $1^i$, $1^k$, $1^l$, and $1^m$, commencing with $1^a$, is connected with the pitch shaft next above it in the series by a gear $89^T$, keyed to the lower shaft, meshing with a gear $84^T$, having eighty four teeth keyed to the next higher shaft of the series; except that gears $90^T$, and $85^T$, having ninety teeth and eighty-five teeth respectively, are keyed to the shafts $1^f$. and $1^g$. respectively, to mesh with the driving gear $45^T$ keyed to the armature-shaft of the electric motor 11. Thus any pair of pitch-shafts corresponding to two consecutive half-tones of the chromatic scale, have angular velocities whose numerical ratios are eighty-four to eighty-nine except that, in the middle of the series we give the two shafts $1^f$, and $1^g$, angular velocities standing to each other as 85 to 90. For the gears $90^T$, and $85^T$, on the shafts $1^f$, and $1^g$, we might substitute gears of eighty-nine teeth and eighty-four teeth respectively— in other words we might give to every pair of adjacent shafts the relative angular velocities of 84 to 89, but the tuning is improved by using a slightly smaller ratio, as for example 85 to 90 for at least one pair of shafts. It is not necessary to use the different ratio between the sixth and seventh shafts of the series; it might be used at some other point but with the ratio 85 to 90 it is desirable to use it at or near the exact middle of the series.

Fig. 27 is adapted to Case A, above described. To adapt the gearing illustrated in Fig. 27 to Case B, described above, we have only to substitute a gear of sixty teeth for the gear $90^T$, of ninety teeth, keyed to the shaft $1^f$, to engage the driving gear $45^T$. To adapt the gearing illustrated in said Fig. 27 to Case C, described above, we have only to substitute for the gear $90^T$, on the shaft $1^f$, a gear of eighty-nine teeth, and for the gear eighty-five teeth on the shaft $1^g$, a gear of one hundred and twelve teeth, in which case it will be desirable also to substitute for the intermeshing gears $89^T$, and $84^T$, on the shafts, $1^e$, and $1^f$, respectively (or on the shafts $1^g$, and $1^h$, respectively) two gears, having ninety and eighty-five teeth respectively. Or we may keep all the gears on the shafts $1^a$, to $1^f$, inclusive and $1^g$, to $1^m$, inclusive exactly as illustrated in Fig. 27, and before described, and use two gears on the driving shaft, of the motor 11, for example a gear, $45^T$. of forty-five teeth, with which the gear $85^T$ keyed to the shaft $1^g$. meshes and another gear $60^T$. having exactly one-third more teeth, with which the gear $90^T$, keyed to the shaft $1^f$. meshes as illustrated in the detail view, Fig. 28.

Instead of arranging the pitch-shafts in one series as in Fig. 27, we may divide them into two or more groups, connecting the members of each group in series and connecting the several groups each preferably at or about its center with the main driving shaft. Fig. 29 illustrates one construction for this purpose, in which the wheels 9 and 10 may have for Cases A, B, and C, before described, the numbers of teeth respectively before described in connection with Figs. 7 to 20.

Figs. 30, 31, 32, and 33 illustrate still other modifications. The wheels 9 and 10, respectively in Figs. 30, and 32, may have, for Cases A, B, and C, respectively, the numbers of teeth already described in connection with Figs. 7 and 20. Figs. 31 and 33 as drawn are adapted for Case A, before described, but may easily be altered to one of the other cases, if desired.

I consider gearing such in principle as that illustrated in Figs. 22 and 25, most suitable for large and heavy machines. For machines of small or medium size, gearing such as that illustrated in Figs. 7 and 32 may be found more convenient, since it does not require so many large (and therefore expensive) cut gear wheels. The gearing illustrated in Figs. 23 and 24 seems more suitable for small or very small machines than for very large ones. The series gearing illustrated in Figs. 27 and 28 has the advantage of requiring no large gears at all, but is subject to the disadvantage that a single pair of intermeshing wheels bears the load of driving half a dozen pitch-shafts and to the further disadvantage, particularly in connection with the larger and more sensitive intervals, such as the fifth, that the connection between one shaft and another is in most cases made through six or more pairs of intermeshing gears, and is, or may be, subject as the gears wear, to the backlash of all.

The tuning is a little nearer to absolute mathematical perfection with the arrangements of gearing illustrated in Figs. 7, 32, 20, and 22 to 24 than with Figs. 27 to 30.

Figs. 7 and 20 to 37, inclusive, are diagrammatic or schematic views in which no attempt is made to show the correct proportions of the parts; to illustrate the scheme of which clearly, without unduly increasing the size of the drawings, the gear wheels, which are the essential features, are illustrated on a much larger scale than the pitch-shafts. The proper arrangement of the pitch-shafts and the gears, with the numbers of teeth in the several gears are clearly marked, but the size of the gears, which should vary according to the loads they are to transmit, is left, of course, to the judgment and skill of the builder. Also no attempt is made to show the journals or bearings, which are matters of ordinary mechanical skill.

The numbers of teeth for the sveral wheels given in the several lists preceding and marked on the several figures are believed to be, in each case, on the whole, the most convenient. But, first, it is to be understood that for any intermeshing pair of wheels, in any of the figures in which gearing is shown we may, so far as the mere principle of the thing is concerned, instead of using the numbers of teeth specified or marked, use equal multiples thereof, or where possible, equal sub-multiples; provided the numbers of teeth in the two intermeshing gears be changed in the same ratio. But in many cases, any such multiplication of the numbers of teeth would necessitate either making the teeth very small or the periphreal speeds very high, both of which are to be avoided; and in many cases any great reduction in the number of the teeth would involve other disadvantages. Secondly, instead of using the relative speed ratios given in the drawings, for the several pairs of intermeshing gears, other and slightly different speed ratios may be used, at least in some cases. But as I have given in each case the speed ratios that I consider most practicable, I shall not burden this specification with any further lists. Thirdly, if the speed of the driving shaft as 8, or $8^a$, with relation to one of the shafts, as $1^a$, or $1^g$, driven by it, be materially altered, the speed of said driving shaft with relation to that of each of the other pitch-shafts, driven by it should be altered in the same or substantially the same proportions; the essential thing being to give to the several pitch-shafts the requisite angular velocities. The relative angular velocities for the twelve pitch-shafts are as follows, for Cases A, B, and C, respectively, representing that of the slowest moving or lowest pitch-shaft $1^a$, by 256 arbitrary units (not degrees or radians) namely:—

|  | In Case A. | In Case B. | In Case C. |
|---|---|---|---|
| For the pitch-shaft $1^a$ | 256 | 256 | 256 |
| " " $1^b$ | 271.22 | 271.22 | 271.22 |
| " " $1^c$ | 287.35 | 287.35 | 287.35 |
| " " $1^d$ | 304.44 | 304.44 | 304.44 |
| " " $1^e$ | 322.54 | 322.54 | 322.54 |
| " " $1^f$ | 341.72 | 341.72 | 341.72 |
| " " $1^g$ | 362.04 | 241.36 | 271.53 |
| " " $1^h$ | 383.57 | 255.71 | 287.68 |
| " " $1^i$ | 406.37 | 270.92 | 304.78 |
| " " $1^k$ | 430.54 | 287.03 | 322.90 |
| " " $1^l$ | 456.14 | 304.09 | 342.11 |
| " " $1^m$ | 483.26 | 322.18 | 362.45 |

Very slight variations from these relative speeds may be made (and in some of the drawings Figs. 7, and 20 to 33 are made) without any perceptible injury to the tuning, but any large variations would affect the tuning injuriously for equal temperament.

I have used steel gears very accurately cut. The best, if not the only way, to secure accuracy in the teeth of the gears is to cut them carefully with a well-built and accurate gear-cutter, or other similar machine. The shafts upon which any two intermeshing gears are respectively mounted should be arranged in the case of spur gears (Figs. 7, 20, 21, 22, and 25, to 37) as nearly as possible rigidly parallel and with the intermeshing or pitch-line nicely adjusted. Excessive peripheral speeds, on the one hand, and unduly small teeth, on the other, should be avoided; but using, as I have done, cast steel gears very accurately cut, speeds are quite safe that would be excessive with uncut castiron gears.

It is important that the shaft 8, Figs. 7 and 20 to 37 be driven with a uniform or nearly uniform velocity; and any motor which is subject to substantial variations in velocity at different points in its cycle or at different moments, is ill adapted to the purpose. For these variations in the angular velocity of the shaft 8 and of the pitch shafts and alternators connected with it, would result in corresponding variations in the key of the composition that is being played, the key rising with any increase in the velocity of the shaft 8, and falling with any decrease in its velocity.

The forms of gearing illustrated in Fig. 7 and Figs. 20 to 33 and before described are adapted to the chromatic scale of equal temperament, which is now in universal or almost universal use throughout Christendom. But the principles of my invention are applicable to other scales.

Figure 34:
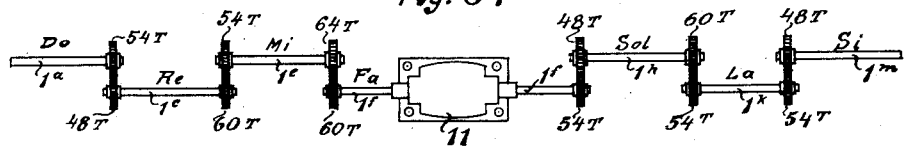

Figs. 34, 35, 36, and 37 illustrate different forms of gearing for the diatonic scale in the natural or just temperament. $1^a$, $1^c$, $1^e$, $1^f$, $1^h$, $1^k$, and $1^m$, are the pitch-shafts, corresponding respectively to the seven notes of the diatonic scale and each giving movement to a plurality of alterations for producing successive octaves of the note to which the shaft carrying them corresponds. In Fig. 34 the shafts $1^a$, $1^c$, $1^e$, $1^f$, $1^h$, $1^k$ and $1^m$ are connected together in series by gear wheels keyed to the respective shafts and having the numbers of teeth marked on them in the drawing; while in Fig. 35 said shafts $1^a$, $1^c$, $1^e$, $1^f$, $1^h$, $1^k$, and $1^m$ are driven respectively by the wheels $192^T$, $216^T$, $240^T$, $256^T$, $288^T$, $320^T$, and $360^T$, which are keyed to the shaft 8 and have respectively 192, 216, 240, 256, 288, 320 and 360 teeth, said wheels meshing each with a gear $48^T$ of 48 teeth keyed to the corresponding pitch-shaft.

Figs. 34 and 35, show gearing adapted to "Case A" described above, in which the alternators carried by each pitch-shaft produce the same number of cycles per revolution as the corresponding alternators carried by the other pitch-shafts. To adapt the gearing illustrated in Fig. 34 to "Case B" or "Case C" above described, it is only necessary to change the numbers of teeth in the gears $54^T$ and $48^T$ that connect the shafts $1^f$ and $1^h$ a gear of 54 teeth, keyed to the shaft $1^f$ and a gear of 72 teeth, keyed to the shaft $1^h$, being used for "Case B" and for "Case C" a gear of 54 teeth keyed to the shaft $1^f$, and one of 64 teeth keyed to the shaft $1^h$. And to adapt the gearing illustrated in Fig. 35 to "Case B" or "Case C" we have only to substitute for the gears $48^T$ of 48 teeth, on the shafts $1^h$, $1^k$, and $1^m$, gears of 72 teeth for "Case B" and of 64 teeth for "Case C."

In Fig. 36, two pitch-shafts 330 and 331 only are used, of which 331 carries the toothed inductors 36, that produce the notes sol, si and re in their successive octaves, while the shaft 330 carries the toothed inductors 36, that produce the notes fa, la, do, mi, in their successive octaves. With the exact arrangement of parts illustrated in Fig. 36 (which may of course be altered within certain limits,) the inductors carried by the shaft 331 have respectively 8, 10, 12, 16, 20, 24, 32, 40, 48, 64, 80 and 96 teeth, while those carried by the shaft 330 have respectively 8, 10, 12, 15, 16, 20, 24, 30, 32, 40, 48, 60, 64, 80, 96, and 120 teeth. The shaft 330 is connected with the shaft 331 by means of a gear $54^T$ of 54 teeth keyed to said shaft 331 and meshing with a gear $48^T$, of 48 teeth, keyed to the shaft 330.

In Fig. 37, all the inductors 36, 36, are carried by a single shaft 330. With the exact arrangement of parts illustrated in Fig. 37 (and which may, of course, be varied from, more or less,) there are thirty-one inductors, having, respectively, 6, 8, 9, 10, 12, 15, 16, 18, 20, 24, 27, 30, 32, 36, 40, 45, 48, 54, 60, 64, 72, 80, 90, 96, 108, 120, 128, 144, 160, 180 and 192 teeth, and of which the inductors having 6, 8, 9 and 10 teeth, respectively, give do, fa, sol, and la in the lowest octave; those having 12, 15, 16, 18 and 20 teeth give, respectively, do, mi, fa, sol, and la in the next octave; those having 24, 27, 30, 32, 36, 40 and 45 teeth give, respectively the seven notes do, re, mi, fa, sol, la and si in the third octave; those having 48, 54, 60, 64, 72, 80 and 90 teeth give the same seven notes in the fourth octave; those having 96, 108, 120, 128, 144, 160, and 180 teeth give, respectively, the same seven notes in the fifth octave; while the inductor of 192 teeth gives the tonic (do) in the sixth octave. Such arrangements of the field-magnet systems and armature coils as are illustrated in Figs. 8 and 10 and 13 to 19 (or such as are illustrated in Figs. 18 and 19) may be used for the inductors illustrated in Figs. 36 and 37; the numbers and sizes of the armature teeth in the field system, being adapted in each case, to the number of teeth on the corresponding rotating inductor; or any other suitable arrangement of field-magnets and armature cores may be used with the rotating inductors; or any other suitable form of alternator, not being an inductor alternator, may be used instead of the inductor alternators shown.

I have illustrated my circuit-closing devices, such as the springs 49, as combined with and arranged to be controlled by, the keys of a keyboard, like to that of a pianoforte or organ. But in the first place it will be obvious that such circuit-closing devices may be operated in any other suitable manner; and secondly as many musical devices are operated or played automatically by note-sheets or the like, which in some cases control, through suitable mechanism, the keys of a pianoforte or cabinet organ and in others control the hammers, valves or other note-taking devices more directly, such note-sheets or other similar automatic devices might be employed to operate my circuit-closing devices above mentioned or their equivalents, either by operating the keys 45, 45, of a keyboard or in any other suitable manner.

The various gearings of the pitch-shafts, illustrated in Figs. 7 and 20 to 37, may be used to give movement to an organization of rotary rheotomes, such as is described in the specification of the Letters Patent before mentioned, dated April 6, 1897, No. 580,035 see particularly Figs. 1 to 14 or to any other suitable arrangement of rotary rheotomes or of rotary electrical vibration-generating devices quite as well as to the set of alternators before described. But for most purposes, if not for all, I consider the alternators preferable, as before stated.

By means of the rheostats 12, 12, (Figs. 8, 13, 14, and 15 and 62) of which it is to be understood, as before explained, that there is one for each alternator (with the construction illustrated in Figs. 8 to 17), the builder or voicer or performer can vary the intensity of excitation of the alternator field-magnets within wide limits, and can thus give to each alternator the voltage which he thinks best.

In an earlier part of the specification I have said, with reference to the generators, that "variations of the whole set from concert pitch are, of course, possible but said variations do not affect the tuning of the notes with relation to one another nor the goodness of the chords." This is to be taken subject to the qualification, that, at the very instant at which the concert pitch is being changed, the goodness of the chords or indeed the goodness of a single note may be affected by the variation in pitch, if that be sufficiently rapid. Any such sensible variation of pitch may be avoided, as before stated, by driving the generators with a uniform velocity. Using an electrical drive, that is, driving the generators with a good, constant-speed electrical motor, fed from a generator of constant voltage, I have not found the changes in speed sufficiently great to affect the quality of the notes or chords, nor indeed to be discoverable with the unaided senses, by the average man.

In several places in this specification and in the statement of claims at the end hereof, I speak of making the tuning perfect or of making the chords perfect, by means of the toothed gearing, connecting the pitch shafts. The word perfect here is used by me to mean and is to be understood as meaning, such perfection or such substantial perfection as the system of temperament used admits of. Thus in the form of apparatus illustrated in Figs. 34, 35, 36 and 37 the chords are "just": that is to say the three notes of the common chord as do, mi, sol, or sol, si, re, or fa, la, do have exactly and absolutely ratios of four, five, six, but with this apparatus there is no capacity for modulation. On the other hand, with the systems of gearing for the chromatic scale of equal temperament before described and illustrated in Figs. 7, and 20 to 33, there is that unlimited capacity for modulation which constitutes the great merit of the equal temperament, but the chords are perfect only in the sense of equal temperament; they are not exactly just, but have these defects, namely, that the fifths are slightly flat (about 1/886) of the just fifth and the major thirds are slightly sharper (about 1/186) than the just major third, with other minor variations of less consequence. The perfection of tuning or of chords spoken of, then, it is to be understood, is only such perfection as the system of temperament may admit of, or such a close approach to that temperamental perfection as is not to be practically distinguished therefrom. And obviously, without departing from the essential features of my invention hereinbefore described and illustrated in and by the accompanying drawings a skilful electrician exercising the skill of his art may by the substitution of equivalents and omissions, additions or alterations, not involving invention, vary the apparatus illustrated in the drawings in many particulars while still retaining the essential principles and combinations or one or more of the essential principles or combinations belonging to my invention.

I do not claim in this application anything that is claimed in my other pending applications, enumerated below, namely: No. 194,113, filed February 17, 1904, continued April 27, 1915, No. 24,190; No. 194,114, filed February 17, 1904, continued June 26, 1915, No. 36,420; No. 317,137, filed May 16, 1906, continued November 8, 1909, No. 526,800½; No. 436,013, filed June 1, 1908; No. 485,645, filed March 25, 1909; and, No. 513,961, filed August 21, 1909.

What therefore I claim as of my invention and desire to secure by Letters Patent on this application is:

1. In combination, a plurality of shafts, and means incapable of slip connecting said shafts together so that they rotate with angular velocities having the same numerical ratios as the vibration-frequencies of consecutive notes of the chromatic scale.

2. In combination, a plurality of shafts and toothed gearing connecting said shafts so that they rotate without slip with angular velocities having the same numerical ratios as the vibration-frequencies of consecutive notes of the chromatic scale.

3. In combination, twelve shafts, and gearing incapable of slip connecting said shafts so that they rotate with angular velocities having the same numerical ratios as the vibration-frequencies of the twelve notes of the chromatic scale.

4. In combination, in a music-generating system, (a) rotary vibration-generating devices for producing respectively vibrations corresponding to consecutive notes of a musical scale, (b) a plurality of shafts, each carrying the rotary members of one or more of the vibration-generating devices aforesaid; and (c) gearing incapable of slip connecting said shafts together so that they rotate with different angular velocities.

5. In combination, in a music-generating system, (a) rotary vibration-generating devices, having vibration-frequencies corresponding to the notes of a musical scale through one or more octaves, (b) a plurality of shafts, each carrying the rotary members of one or more of the vibration-generating devices aforesaid; and (c) gearing incapable of slip connecting said shafts together so that they rotate with different angular velocities.

6. In combination, in a music-generating system, (a) a plurality of vibration-generating devices for producing respectively vibrations corresponding to musical notes of different pitches; (b) a plurality of shafts, each carrying the rotary members of one or more of the vibration-generating devices aforesaid; and (c) gearing incapable of slip connecting said shafts together so that they rotate with angular velocities having the same numerical ratios as the vibration-frequencies of consecutive notes of a musical scale.

7. In combination, in a music-generating system, (a) a plurality of rotary vibration-generating devices; (b) a plurality of shafts, each giving movement to a different one of the vibration-generating devices aforesaid; and (c) gearing incapable of slip connecting said shafts so that they rotate with angular velocities having the same numerical ratios as the vibration-frequencies of consecutive notes of the chromatic scale.

8. In combination, in a music-generating system, (a) twelve rotary vibration-generating devices for producing respectively vibrations corresponding to the twelve notes of the chromatic scale; (b) twelve shafts, each giving movement to one of said vibration-generating devices, and (c) gearing incapable of slip connecting said shafts so that they rotate with different angular velocities, as required.

9. In combination, in a music-generating system, (a) twelve rotary vibration-generating devices all having the same vibration-frequency per revolution; (b) twelve shafts, each carrying one of said vibration-generating devices; and (c) gearing incapable of slip connecting said shafts so that they rotate with angular velocities corresponding to the vibration-frequencies of the twelve notes of the chromatic scale.

10. A music-generating apparatus having, in combination, (a) rotary vibration-generating devices, corresponding to the notes of a musical scale through more than one octave; (b) a plurality of shafts, each carrying the rotary members of a plurality of the vibration-generating devices as aforesaid, having vibration frequencies standing to each other as different powers of two and serving to produce respectively different octaves of the same note; and (c) gearing, incapable of slip, connecting said shafts together so that they rotate with different angular velocities as required.

11. A music-generating apparatus having, in combination, (a) rotary vibration-generating devices, corresponding to the notes of a musical scale through more than one octave; (b) twelve shafts, each carrying the rotary members of a plurality of the vibration-generating devices aforesaid, whose vibration frequencies stand to each other numerically as different powers of two and which serve to produce respectively different octaves of the same note; the vibration-generating devices, impelled by the twelve shafts aforesaid respectively, corresponding respectively to the twelve notes of the chromatic scale; and (c) gearing, incapable of slip, connecting said shafts together so that they rotate with different angular velocities as required.

12. A music-generating apparatus having, in combination, (a) rotary vibration-generating devices corresponding to the notes of a musical scale, through more than one octave; (b) twelve shafts, each carrying the rotary members of a plurality of the vibration-generating devices aforesaid, whose vibration frequencies stand to each other numerically as different powers of two and which serve to produce respectively different octaves of the same note; the vibration-generating devices, impelled by the twelve shafts aforesaid respectively, corresponding respectively to the twelve notes of the chromatic scale; and (c) gearing, incapable of slip, connecting said shafts together so that they rotate with angular velocities corresponding respectively to the vibration frequencies of the twelve notes of the chromatic scale.

13. In combination, in an electrical music-generating system, (a) a plurality of alternators; (b) a plurality of shafts each giving movement to one of said alternators; and (c) gearing incapable of slip connecting said shafts so that they rotate with angular velocities having the same numerical ratios as the vibration-frequencies of consecutive notes of a musical scale.

14. In combination, in an electrical music-generating system, (a) alternators having vibration-frequencies corresponding to the notes of a musical scale through one or more octaves; (b) a plurality of shafts, each giving movement to one or more of said alternators; and (c) gearing incapable of slip connecting said shafts so that they rotate with different angular velocities, as required.

15. In combination, in an electrical music-generating system (a) a plurality of alternators; (b) a plurality of shafts, each giving movement to one of said alternators; and (c) gearing incapable of slip connecting said shafts so that they rotate with angular velocities having the same numerical ratios as the vibration-frequencies of consecutive notes of the chromatic scale.

16. In combination, in an electrical music-generating system, (a) twelve alternators having vibration-frequencies corresponding respectively to the twelve notes of the chromatic scale; (b) a plurality of shafts carrying the rotary members of said alternators; and (c) gearing incapable of slip connecting said shafts so that they rotate with different angular velocities, as required.

17. In combination, in an electrical music-generating system, (a) twelve alternators having vibration-frequencies corresponding respectively to the twelve notes of the chromatic scale; (b) twelve shafts carrying the rotary members of the twelve alternators aforesaid, respectively; and (c) gearing incapable of slip connecting said shafts so that they rotate with different angular velocities, as required.

18. In combination, in an electrical music-generating system, (a) twelve alternators constructed to produce equal numbers of vibrations per revolution; (b) twelve shafts carrying the rotary members of the twelve alternators aforesaid; respectively; and (c) gearing incapable of slip connecting said shafts so that they rotate with angular velocities having the same numerical ratios as the vibration-frequencies of the twelve notes of the chromatic scale.

19. In combination in an electrical music-generating system, (a) a plurality of groups of alternators, different alternators of a group being constructed to produce different numbers of electrical vibrations per revolution; (b) a plurality of shafts, each giving movement to a different group of the alternators aforesaid; and (c) gearing incapable of slip connecting said shafts so that they rotate with different angular velocities, as required.

20. In combination, in an electrical music-generating system, (a) a plurality of groups of alternators, different alternators of a group being constructed to produce different numbers of electrical vibrations per revolution; (b) a plurality of shafts, each giving movement to a different group of the alternators aforesaid; and (c) gearing incapable of slip connecting said alternators so that they rotate with angular velocities having the same numerical ratios as the vibration-frequencies of consecutive notes of a musical scale.

21. In combination, in an electrical music-generating system, (a) a plurality of groups of alternators, different alternators of a group being constructed to produce different numbers of electrical vibrations per revolution; (b) a plurality of shafts, each giving movement to a different group of the alternators aforesaid; and (c) gearing incapable of slip connecting said alternators so that they rotate with angular velocities having the same numerical ratios as the vibration-frequencies of consecutive notes of the chromatic scale.

22. In combination, in an electrical music-generating system, (a) twelve groups of alternators; said groups corresponding to the twelve notes of the chromatic scale, and the different alternators of a group having vibration-frequencies standing to each other as different powers of two and serving to produce electrical vibrations corresponding in frequency to different octaves of the notes of the chromatic scale to which such group corresponds; (b) a plurality of shafts for giving movement to the alternators aforesaid; and (c) gearing incapable of slip connecting said shafts so that they rotate with different angular velocities.

23. A music-generating apparatus having, in combination, (a) alternators, corresponding to the notes of a musical scale through more than one octave; (b) twelve shafts, each carrying the rotary members of a plurality of the alternators aforesaid, whose vibration-frequencies stand to each other numerically as different powers of two and which serve to produce respectively different octaves of the same note; the alternators, impelled by the twelve shafts aforesaid respectively, corresponding respectively to the twelve notes of the chromatic scale; and (c) gearing, incapable of slip, connecting said shafts together so that they rotate with different angular velocities as required.

24. A music-generating apparatus having, in combination, (a) alternators, corresponding to the notes of a musical scale, through more than one octave; (b) twelve shafts, each carrying the rotary members of a plurality of the alternators aforesaid, whose vibration-frequencies stand to each other numerically as different powers of two and which serve to produce respectively different octaves of the same note; the alternators, impelled by the twelve shafts aforesaid respectively, corresponding respectively to the twelve notes of the chromatic scale; and (c) gearing, incapable of slip, connecting the shafts aforesaid together so that they rotate with angular velocities corresponding respectively to the vibration frequencies of the twelve notes of the chromatic scale.

25. In combination, in an electrical music generating system, (a) a plurality of groups of alternators; the different groups of alternators corresponding to different notes, and the alternators of each group having vibration-frequencies standing to each other as different powers of two, and serving to produce electrical vibrations corresponding in frequency to different octaves of the notes for which such group stands; (b) a plurality of shafts, each giving movement to one of the groups of alternators aforesaid; and (c) positive gearing connecting said shafts together in series so that they rotate without slip with angular velocities having the same numerical ratios as the vibration-frequencies of the notes of the chromatic scale; one speed ratio being used in connecting one or more pairs of said shafts and a different speed-ratio being used in connecting one or more other pairs of said shafts.

26. In combination, in an electrical music-generating system, (a) a plurality of alternators, for producing electrical vibrations having frequencies corresponding to musical sounds of different pitches; (b) twelve shafts, each carrying the rotary members of a plurality of the alternators aforesaid, whose vibration frequencies stand to each other numerically as different powers of two and which serve to produce respectively different octaves of the same note; the alternators, impelled by the twelve shafts aforesaid respectively, corresponding respectively to the twelve notes of the chromatic scale; and (c) positive gearing connecting said shafts together in series so that they rotate without slip with different angular velocities as required.

27. In combination, in an electrical music-generating system, (a) a plurality of alternators for producing electrical vibrations corresponding to musical notes of different pitches; (b) a plurality of shafts, each giving movement to one of said alternators; (c) gearing incapable of slip connecting said shafts so that they rotate, each with the angular velocity required; (d) vibration-translating apparatus, whereby electrical vibrations are translated into audible vibrations; and (e) note-controlling devices whereby the notes to which the alternators aforesaid respectively correspond, are caused to sound, each as required, in the vibration-translating apparatus aforesaid.

28. In combination, in an electrical music-generating system, (a) a plurality of alternators; (b) a plurality of shafts, each giving movement to one of said alternators; (c) gearing incapable of slip connecting said shafts so that they rotate with angular velocities having the same numerical ratios as the vibration-frequencies of consecutive notes of a musical scale; (d) vibration-translating apparatus, whereby electrical vibrations are translated into audible vibrations; and (e) note-controlling devices whereby the notes to which the alternators aforesaid respectively correspond, are caused to sound, each as required, in the vibration-translating apparatus aforesaid.

29. In combination, in an electrical music-generating system, (a) a plurality of alternators; (b) a plurality of shafts, each giving movement to one of said alternators; (c) gearing incapable of slip connecting said shafts so that they rotate with angular velocities having the same numerical ratios as the vibration-frequencies of consecutive notes of the chromatic scale; (d) vibration-translating apparatus, whereby electrical vibrations are translated into audible vibrations; and (e) note-controlling devices whereby the notes to which the alternators aforesaid respectively correspond, are caused to sound, each as required, in the vibration-translating apparatus aforesaid.

30. In combination, in an electrical music-generating system, (a) alternators having vibration-frequencies corresponding to the notes of a musical scale through one or more octaves; (b) a plurality of shafts, each giving movement to one or more of said alternators; (c) gearing incapable of slip connecting said shafts so that they rotate with different angular velocities as required; (d) vibration-translating apparatus whereby electrical vibrations are translated into audible vibrations; and (e) note-controlling devices whereby the notes to which the alternators aforesaid respectively correspond, are caused to sound, each as required, in the vibration-translating apparatus aforesaid.

31. In combination, in an electrical music-generating system, (a) twelve alternators for producing electrical vibrations corresponding to the twelve notes of the chromatic scale; (b) a plurality of shafts carrying the rotary members of said alternators; (c) gearing incapable of slip connecting said shafts so that they rotate with different angular velocities as required; (d) vibration-translating apparatus, whereby electrical vibrations are translated into audible vibrations; and (e) note-controlling devices, whereby the notes to which the alternators aforesaid respectively correspond, are caused to sound, each as required, in the vibration-translating apparatus aforesaid.

32. In combination, in an electrical music-generating system, (a) twelve alternators constructed to produce equal numbers of vibrations per revolution; (b) twelve shafts carrying the rotary members of the twelve alternators aforesaid, respectively; (c) gearing incapable of slip connecting said shafts so that they rotate with angular velocities having the same numerical ratios as the twelve notes of the chromatic scale; (d) vibration-translating apparatus, whereby electrical-vibrations are translated into audible vibrations; and (e) note-controlling devices, whereby the notes to which the alternators aforesaid respectively correspond, are caused to sound, each as required, in the vibration-translating apparatus aforesaid.

33. An electrical music-generating system having, in combination (a) a plurality of groups of alternators, different alternators of a group being constructed to produce different numbers of electrical vibrations per revolution; (b) a plurality of shafts, each giving movement to a different group of the alternators aforesaid; (c) gearing incapable of slip connecting said shafts so that they rotate with different angular velocities, as required; (d) vibration-translating apparatus, whereby electrical vibrations are translated into audible vibrations; and (e) note-controlling devices, whereby the notes to which the alternators aforesaid respectively correspond, are caused to sound, each as required, in the vibration-translating apparatus aforesaid.

34. An electrical-music-generating system having, in combination (a) a plurality of groups of alternators, different alternators of a group being constructed to produce different numbers of electrical vibrations per revolution; (b) a plurality of shafts, each giving movement to a different group of the alternators aforesaid; (c) gearing incapable of slip connecting said alternators so that they rotate with angular velocities having the same numerical ratios as the notes of a musical scale; (d) vibration-translating apparatus, whereby electrical vibrations are translated into audible vibrations; and (e) note-controlling devices, whereby the notes to which the alternators aforesaid respectively correspond, are caused to sound, each as required, in the vibration-translating apparatus aforesaid.

35. In combination, in an electrical music-generating system, (a) twelve groups of alternators; said groups corresponding to the twelve notes of the chromatic scale, and the different alternators of a group having vibration-frequencies standing to each other as different powers of two and serving to produce respectively vibrations corresponding to different octaves of the notes of the chromatic scale to which such group corresponds; (b) a plurality of shafts for giving movement to the alternators aforesaid; (c) gearing incapable of slip connecting said shafts so that they rotate with different angular velocities; (d) vibration-translating apparatus, whereby electrical vibrations are translated into audible vibrations; and (e) note-controlling devices, whereby the notes to which the alternators aforesaid respectively correspond, are caused to sound, each as required, in the vibration-translating apparatus aforesaid.

36. In combination, in an electrical music-generating system, (a) a plurality of alternators having vibration-frequencies corresponding to consecutive notes of a musical scale; and (b) means for varying the voltages of the vibrations produced by said alternators, one alternator independently of another.

37. In combination, in an electrical music-generating system, (a) a series of alternators having vibration-frequencies corresponding to consecutive notes of a musical scale through one or more octaves; and (b) means for varying the voltages of the vibrations produced by said alternators, one alternator independently of another.

38. In combination, in an electrical music-generating system, (a) a plurality of alternators having vibration-frequencies corresponding respectively to musical notes of different pitches; (b) a plurality of shafts, each giving movement to one or more of the alternators aforesaid; (c) positive gearing connecting said shafts together so that they rotate without slip with different angular velocities, as required to give to the alternators carried by each shaft the necessary vibration-frequencies; and (d) means for varying the voltages of the vibrations produced by the alternators aforesaid, one alternator independently of another.

39. In combination, in an electrical music-generating system, (a) a series of alternators having vibration-frequencies corresponding to the notes of a musical scale through one or more octaves; (b) a plurality of shafts, each carrying the rotary members of one or more of the alternators aforesaid; (c) positive gearing connecting said shafts together so that they rotate without slip with different angular velocities; and (d) means for varying the voltages of the vibrations produced by the alternators aforesaid, one alternator independently of another.

40. In combination, in an electrical music-generating system, (a) a plurality of alternators having vibration-frequencies corresponding to consecutive notes of a musical scale; and (b) devices for governing the intensities of field of the alternators aforesaid, one alternator independently of another.

41. In combination, in an electrical music-generating system, (a) a series of alternators having vibration-frequencies corresponding to the notes of a musical scale through one or more octaves; (b) a plurality of shafts, each carrying the rotary members of one or more of the alternators aforesaid; (c) positive gearing connecting said shafts together so that they rotate without slip with different angular velocities; and (d) devices for governing the intensities of field of the alternators aforesaid, one alternator independently of another.

42. In combination, in an electrical music-generating system, (a) a plurality of alternators having vibration-frequencies corresponding to consecutive notes of a musical scale; and, (b) rheostats for varying the intensities of field of the alternators aforesaid, whereby the loudness of the sounds produced by the several alternators may be governed, one independently of another.

43. In combination, in an electrical music-generating system, (a) a series of alternators having vibration-frequencies corresponding to the notes of a musical scale through one or more octaves; (b) a plurality of shafts, each carrying the rotary members of one or more of the alternators aforesaid; (c) positive gearing connecting said shafts together so that they rotate without slip with different angular velocities; and (d) rheostats for varying the intensities of field of the alternators aforesaid, whereby the loudness of the sounds produced by said alternators may be governed.

44. In combination, in an electrical music-generating system, (a) a line; (b) one or more common-receiver vibration-translating devices fed with electrical vibrations from said line; (c) an alternator for causing a musical tone in said vibration-translating devices; (d) a note-controlling device, whereby said alternator is caused to throw vibrations upon the line aforesaid, when required; and (e) means for varying the voltage of the electrical vibrations produced in the armature of said alternator.

45. In combination, in an electrical music-generating system, (a) a line; (b) one or more common-receiver vibration-translating devices fed with electrical vibrations from said line; (c) an alternator for causing a musical tone in said vibration-translating devices; (d) a note-controlling device, whereby said alternator is caused to throw vibrations upon the line aforesaid, when required; and (e) means for varying the intensity of field of the alternator aforesaid.

46. In combination, in an electrical music-generating system, (a) a line; (b) one or more common-receiver vibration-translating devices fed with electrical vibrations from said line; (c) an alternator for causing a musical tone in said vibration-translating devices; (d) a note-controlling device, whereby said alternator is caused to throw vibrations upon the line aforesaid, when required; and (e) a rheostat inserted in the exciting circuit of said alternator, whereby the loudness of the note caused by said alternator in the vibration-translating devices aforesaid may be governed.

47. In combination, in an electrical music-generating system, (a) a plurality of alternators having vibration-frequencies corresponding to musical notes of different pitches; (b) vibration-translating apparatus, whereby electrical vibrations are translated into audible vibrations; (c) note-controlling devices, whereby the notes, to which the alternators aforesaid respectively correspond, are caused to sound, each as required, in the vibration-translating apparatus aforesaid; and (d) devices for varying the voltages of the electrical vibrations produced in the armatures of said alternators, one alternator independently of another.

48. In combination, in an electrical music-generating system, (a) a plurality of alternators having vibration frequencies corresponding to musical notes of different pitches; (b) vibration-translating apparatus, whereby electrical vibrations are translated into audible vibrations; (c) note-controlling devices, whereby the notes, to which the alternators aforesaid respectively correspond, are caused to sound, each as required, in the vibration-translating apparatus aforesaid; and (d) means for varying the intensity of field of the alternators aforesaid, one alternator independenly of another.

49. In combination, in an electrical music-generating system, (a) a plurality of alternators, having vibration-frequencies corresponding to musical notes of different pitches; (b) vibration-translating apparatus, whereby electrical vibrations are translated into audible vibrations; (c) note-controlling devices, whereby the notes, to which the alternators aforesaid respectively correspond, are caused to sound, each as required, in the vibration-translating apparatus aforesaid; and (d) rheostats for controlling the intensities of fields of the several alternators aforesaid, a rheostat for each alternator, whereby the voltages of the vibrations produced in the armature circuits of said alternators may be controlled, one independently of another.

50. In combination, in an electrical music-generating system, (a) a plurality of alternators having vibration-frequencies corresponding to musical notes of different pitches; (b) a plurality of shafts, each giving movement to one or more of said alternators; (c) gearing incapable of slip connecting said shafts together so that they rotate with different angular velocities as required; (d) vibration-translating apparatus, whereby electrical vibrations are translated into audible vibrations; (e) note controlling devices whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

51. In combination, in an electrical music-generating system, (a) a plurality of alternators having vibration-frequencies corresponding to musical notes of different pitches; (b) a plurality of shafts, each giving movement to one or more of said alternators; (c) gearing incapable of slip connecting said shafts together so that they rotate with different angular velocities, as required; (d) vibration-translating apparatus, whereby electrical vibrations are translated into audible translations; (e) note-controlling devices whereby the notes to which the alternators aforesaid respectively correspond, are caused to sound, each as required, in the vibration-translating apparatus aforesaid; and (f) rheostats for controlling the intensities of field of the several alternators aforesaid.

52. In combination, in an electrical music-generating system, (a) a plurality of alternators constructed to produce equal numbers of vibrations per revolution; (b) a plurality of shafts, each giving movement to one of said alternators; (c) positive gearing connecting said shafts together so that they rotate without slip with angular velocities corresponding to the vibration-frequencies of consecutive notes of a musical scale; (d) vibration-translating apparatus, whereby electrical vibrations are translated into audible vibrations; (e) note-controlling devices whereby the notes, to which the alternators aforesaid respectively correspond, are caused to sound, each as required, in the vibration-translating apparatus aforesaid; and (f) devices for varying the voltages of the electrical-vibrations produced in the armatures of the alternators aforesaid, one alternator independently of another.

53. In combination, in an electrical music-generating system, (a) a plurality of alternators constructed to produce equal numbers of vibrations per revolution; (b) a plurality of shafts, each giving movement to one of said alternators; (c) positive gearing connecting said shafts together so that they rotate without slip with angular velocities corresponding to the vibration-frequencies of consecutive notes of the chromatic scale; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

54. In combination, in an electrical music-generating system, (a) a plurality of alternators constructed to produce equal numbers of vibrations per revolution; (b) a plurality of shafts, each giving movement to one of said alternators; (c) positive gearing connecting said shafts together so that they rotate without slip with angular velocities corresponding to the vibration frequencies of consecutive notes of the chromatic scale; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) rheostats for controlling the intensities of field of the several alternators aforesaid, one alternator independently of another.

55. In combination, in an electrical music-generating apparatus, (a) alternators, having vibration frequencies corresponding to the notes of the musical scale through more than one octave; (b) a plurality of shafts, each giving movement to a plurality of said alternators, whose vibration frequencies stand to each other numerically as different powers of two; (c) positive gearing connecting said shafts together so that they rotate without slip with angular velocities whose numerical ratios are the same as the vibration-frequencies of consecutive notes of a musical scale; (d) vibration-translating apparatus, whereby electrical vibrations are translated into audible vibrations; (e) note-controlling devices whereby the notes, to which the alternators aforesaid respectively correspond, are caused to sound, each as required, in the vibration translating apparatus aforesaid; and (f) devices for varying the voltages of the electrical vibrations produced in the armatures of the alternators aforesaid, one alternator independently of another.

56. In combination, in an electrical music-generating apparatus, (a) alternators, having vibration frequencies corresponding to the notes of a musical scale through more than one octave; (b) a plurality of shafts, each giving movement to a plurality of said alternators, whose vibration frequencies stand to each other numerically as different powers of two; (c) positive gearing connecting said shafts together so that they rotate without slip with angular velocities whose numerical ratios are the same as the vibration-frequencies of consecutive notes of the chromatic scale; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

57. In combination, in an electrical music-generating apparatus, (a) alternators, having vibration frequencies corresponding to the notes of a musical scale through more than one octave; (b) a plurality of shafts, each giving movement to a plurality of said alternators, whose vibration frequencies stand to each other numerically as different powers of two; (c) positive gearing connecting said shafts together so that they rotate without slip with angular velocities whose numerical ratios are the same as the vibration-frequencies of consecutive notes of the chromatic scale; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) rheostats for controlling the intensities of field of the several alternators aforesaid, one alternator independently of another.

58. In combination, in an electrical music-generating system, (a) a series of alternators having vibration-frequencies corresponding to the notes of a musical scale through one or more octaves; (b) a plurality of shafts, each giving movement to one or more of said alternators; (c) positive gearing connecting said shafts together so that they rotate without slip, each with the angular velocity required; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

59. In combination, in an electrical music-generating system (a) a series of alternators having vibration-frequencies corresponding to the notes of the chromatic scale through one or more octaves; (b) a plurality of shafts, each giving movement to one or more of said alternators; (c) positive gearing connecting said shafts together so that they rotate without slip, each with the angular velocity required; (d) vibration-translating apparatus, whereby electrical vibrations are translated into audible vibrations; (e) note-controlling devices whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

60. In combination, in an electrical music-generating system, (a) a series of alternators having vibration-frequencies corresponding to the notes of the chromatic scale through one or more octaves; (b) a plurality of shafts, each giving movement to one or more of said alternators; (c) positive gearing connecting said shafts together so that they rotate without slip, each with the angular velocity required; (d) vibration-translating apparatus, whereby electrical vibrations are translated into audible vibrations; (e) note-controlling devices whereby the notes, to which the alternators aforesaid respectively correspond, are caused to sound, each as required, in the vibration-translating apparatus aforesaid; and (f) rheostats for controlling the intensities of field of the several alternators aforesaid, one alternator independently of another.

61. In combination, in an electrical music-generating system, (a) twelve alternators constructed to produce the same number of vibrations per revolution; (b) twelve shafts, each giving movement to one of said alternators; (c) positive gearing connecting said shafts together so that they rotate without slip with angular velocities whose numerical ratios are the same as the vibration-frequencies of the twelve notes of the chromatic scale; (d) vibration-translating apparatus, whereby electrical vibrations are translated into audible vibrations; (e) note-controlling devices, whereby the notes, to which the alternators aforesaid respectively correspond, are caused to sound, each as required, in the vibration-translating apparatus aforesaid; and (f) devices for varying the voltages of the electrical vibrations produced in the armatures of the alternators aforesaid, one alternator independently of another.

62. In combination, in an electrical music-generating apparatus, (a) alternators, corresponding, in respect to their vibration frequencies, to the notes of the musical scale, through more than one octave; (b) twelve shafts corresponding to the twelve notes of the chromatic scale, and each, in general, giving movement to a plurality of the alternators aforesaid, having vibration-frequencies standing to each other numerically as different powers of two; and serving to produce vibrations corresponding to different octaves of that note of the chromatic scale to which the shaft giving movement to them corresponds; (c) positive gearing connecting said shafts together so that they rotate without slip, each with the angular velocity required; (d) vibration-translating apparatus, whereby electrical vibrations are translated into audible vibrations; (e) note-controlling devices, whereby the notes, to which the alternators aforesaid respectively correspond are caused to sound, each as required, in the vibration-translating apparatus aforesaid; and (f) devices for varying the voltages of the electrical vibrations produced in the armatures of the alternators aforesaid, one alternator independently of another.

63. In combination, in an electrical music-generating system, (A) a line; (B) electrical vibration-generating devices, having vibration-frequencies corresponding to musical notes of different pitches for producing musical electrical vibrations in said line; (C) note-controlling devices, whereby said vibration-generating devices are caused to produce their respective vibrations in said line, each as required; and (D) a vibration-translating device, including, (a) a diaphragm; (b) means for vibrating said diaphragm in accordance with the electrical vibrations in the line aforesaid; and (c) a reinforcing pipe or chamber, whereby the notes produced by the diaphragm aforesaid are softened in quality and strengthened in power.

64. In combination, in an electrical music-generating system, (A) a line; (B) electrical vibration-generating devices, having vibration-frequencies corresponding to the notes of a musical scale through one or more octaves; (C) note-controlling devices, whereby said vibration-generating devices are caused to produce their respective vibrations in said line, each as required; and (D) a vibration-translating device, including (a) a diaphragm; (b) means for vibrating said diaphragm in accordance with the electrical vibrations in the line aforesaid; and (c) a reinforcing pipe or chamber.

65. In combination, in an electrical music-generating system, (A) a line; (B) electrical vibration-generating devices having vibration-frequencies corresponding to musical notes of different pitches for producing the requisite musical electrical vibrations in said line; (C) note-controlling devices, whereby said vibration-generating devices are caused to produce their respective vibrations in said line, as required; (D) devices whereby the loudness of the notes produced by the vibration-generating devices may be varied, one independently of another; and (E) vibration-translating devices, including (a) a diaphragm; (b) means for vibrating said diaphragm in accordance with the electrical vibrations in the line aforesaid; and (c) a reinforcing pipe or chamber.

66. In combination, in an electrical music-generating system, (A) a line; (B) electrical vibration-generating devices having vibration-frequencies corresponding to musical notes of different pitches for producing the requisite musical electrical vibrations in said line; (C) note controlling devices, whereby said vibration-generating devices are caused to produce their respective vibrations in said line, as required; (D) devices acting to vary the power of the electrical vibrations produced in the line aforesaid by the several vibration-generating devices aforesaid, by varying the intensity of fields belonging to said vibration-generating devices, respectively; and (E) vibration-translating devices, including, (a) a diaphragm; (b) means for vibrating said diaphragm in accordance with the electrical vibrations in the line aforesaid; and (c) a reinforcing pipe or chamber.

67. In combination, in an electrical music-generating system, (A) a line; (B) electrical vibration-generating devices having vibration-frequencies corresponding to musical notes of different pitches for producing the requisite musical electrical vibrations in said line; (C) note-controlling devices whereby said vibration-generating devices are caused to produce their respective vibrations in said line, as required; (D) devices whereby the loudness of the notes produced by the vibration-generating devices aforesaid may be varied, one independently of another; and (E) one or more vibration-translating devices each including, (a) a diaphragm; (b) means for vibrating said diaphragm in accordance with the electrical vibrations in the line aforesaid; and (c) a reinforcing pipe or chamber; and (F) devices acting to control the loudness of sounds produced in the vibration-translating apparatus aforesaid, by the several vibration-generating devices aforesaid, by varying the voltage of the vibrations produced by said vibration-generating devices.

68. In combination, in an electrical music-generating system, (A) a line; (B) electrical vibration-generating devices having vibration-frequencies corresponding to musical notes of different pitches for producing the requisite musical electrical vibrations in said line; (C) note-controlling devices, whereby said vibration-generating devices are caused to produce their respective vibrations in said line as required; (D) devices whereby the loudness of the notes produced by the vibration-generating devices aforesaid may be varied, one independently of another; (E) one or more vibration-translating devices each including, (a) a diaphragm; (b) means for vibrating said diaphragm in accordance with the electrical vibrations in the line aforesaid; and (c) a reinforcing pipe or chamber; and (F) devices acting to control the loudness of sounds produced in the vibration-translating apparatus aforesaid, by the vibration-generating devices aforesaid, by varying the resistance of a circuit.

69. In combination, in an electrical music-generating system, (A) rotary vibration-generating devices for producing electrical vibrations corresponding to musical notes of different pitches; (B) a plurality of shafts, each carrying one or more of the rotary vibration-generating devices aforesaid; (C) gearing incapable of slip, connecting said shafts together so that they rotate with different angular velocities, as required; (D) a vibration-translating device including (a) a diaphragm, (b) means for vibrating said diaphragm electrically, and (c) a reinforcing pipe or chamber whose contained air is set in vibration by said diaphragm; and (E) means whereby the rotary vibration-generating devices aforesaid are caused to act on the vibration-translating devices aforesaid, each as required.

70. In combination, in an electrical music-generating system, (A) rotary vibration-generating devices, having vibration-frequencies corresponding to consecutive notes of a musical scale; (B) a plurality of shafts, each carrying one or more of the rotary vibration-generating devices aforesaid; (C) gearing incapable of slip, connecting said shafts together so that they rotate with different angular velocities, as required; (D) a vibration-translating device including (a) a diaphragm, (b) means for vibrating said diaphragm electrically; and (c) a reinforcing pipe or chamber whose contained air is set in vibration by said diaphragm; and (E) means whereby the rotary vibration-generating devices aforesaid are caused to act on the vibration-translating devices aforesaid, each as required.

71. In combination, in an electrical music-generating system, (A) alternators having vibration-frequencies corresponding to consecutive notes of a musical scale; (B) a plurality of shafts, each giving movement to one or more of said alternators; (C) gearing incapable of slip, connecting said shafts together so that they rotate with different angular velocities, as required; (D) a vibration-translating device including (a) a diaphragm, (b) means for vibrating said diaphragm electrically, and (c) a reinforcing pipe or chamber whose contained air is set in vibration by said diaphragm; and (E) note-controlling devices, whereby the alternators aforesaid are caused to act, each as required, on the vibration-translating devices aforesaid.

72. An electrical music-generating and distributing system, in which electrical vibrations, corresponding to the notes of a tune, are generated at a central station and distributed therefrom to vibration-translating devices located at different places, said system including, in combination, (A) electrical vibration-generating devices, located at a central station and acting to produce electrical vibrations corresponding to the notes of a tune, and (B) a plurality of vibration-translating devices, located at different places more or less remote from said central station, and adapted to be caused to act by the electrical vibrations generated at said central station; each of a plurality of said vibration-translating devices including (a) a diaphragm, (b) means for vibrating said diaphragm electrically, and (c) a reinforcing pipe or chamber acted on by said diaphragm.

73. An electrical music-generating and distributing system, in which electrical vibrations corresponding to the notes of a tune are generated at a central station and distributed therefrom to vibration-translating devices located at different places, said system including, in combination, (A) alternators, located at a central station, and having vibration-frequencies corresponding to the notes of a musical scale; and (B) a plurality of vibration-translating devices, located at different places more or less remote from said central station, and adapted to be caused to act by the electrical vibrations generated at said central station; each of a plurality of said vibration-translating devices including, (a) a diaphragm, (b) means for vibrating said diaphragm electrically, and (c) a reinforcing pipe or chamber acted on by said diaphragm.

74. An electrical music-generating system including, in combination, (A) means for producing musical electrical vibrations; (B) a device for translating electrical vibrations into audible aerial vibrations, said device including, (a) a diaphragm, (b) an electro-magnet for vibrating said diaphragm; (c) a frame or case wherein said diaphragm is secured; and (d) a reinforcing pipe or horn acted on by the diaphragm aforesaid; the frame or case aforesaid including a hollow cap, so shaped as to form a vibration-chamber on one side of the diaphragm and to connect said vibration-chamber with the horn aforesaid.

75. An electrical music-generating system including, in combination, (A) means for producing musical electrical vibrations; (B) a device for translating electrical vibrations into audible aerial vibrations, said device including, (a) a diaphragm, (b) an electro-magnet for vibrating said diaphragm; (c) a frame or case wherein said diaphragm is secured; and (d) a reinforcing pipe or horn acted on by the diaphragm aforesaid; the frame or case aforesaid having an opening formed in it to receive the small end of said horn and to hold said horn in air-tight or nearly air-tight connection with said diaphragm.

76. An electrical music-generating and distributing system including, in combination, (A) a central station and vibration-generating devices thereat, whereby electrical vibrations corresponding to the notes of a tune are produced; (B) mains or lines leading from said central station and fed with electrical vibrations aforesaid; (C) a plurality of vibration-translating devices located on subscriber's premises, more or less remote, from said central station, and each including (a) a diaphragm, (b) an electro-magnet fed with electrical vibrations in a suitable manner from the lines or mains aforesaid, and serving to vibrate the diaphragm aforesaid; (c) a frame or case wherein said diaphragm is secured; and (d) a reinforcing pipe or horn acted on by the diaphragm aforesaid; the frame or case aforesaid having an opening formed in it to receive the small end of said horn and to hold said horn in air-tight or nearly air-tight connection with said diaphragm.

77. In an electrical music-generating and distributing system, (A) a central station music generating apparatus including alternators for producing electrical-vibrations corresponding to the notes of a tune; (B) mains or lines leading from said central station and fed with electrical-vibrations by means of the alternators aforesaid; (C) vibration-translating devices located on divers premises more or less remote from said central station, and which include (a) a diaphragm; (b) an electro-magnet fed with electrical-vibrations in a suitable manner from the lines or mains aforesaid, and serving to vibrate the diaphragm aforesaid, and (c) a reinforcing pipe or horn acted on by said diaphragm.

78. In an electrical music-generating and distributing system, (A) a central station music-generating apparatus including (a) alternators for producing electrical-vibrations corresponding to the notes of a musical scale; said alternators having different vibration frequencies; (b) a plurality of shafts on which said alternators are mounted; (c) toothed-gearing connecting said shafts, so that they rotate with the relative angular velocities required; (B) mains or lines leading from said central station and fed with electrical-vibrations by means of the alternators aforesaid; (C) vibration-translating devices located on divers premises more or less remote from said central station, and which include (a) a diaphragm; (b) an electro-magnet fed with electrical-vibrations in a suitable manner from the lines or mains aforesaid, and serving to vibrate the diaphragm aforesaid, and (c) a reinforcing pipe or horn acted on by said diaphragm.

79. In an electrical music-generating and distributing system, (A) a central station music-generating apparatus including (a) alternators for producing electrical-vibrations corresponding to the notes of a musical scale; said alternators having different vibration frequencies; (b) a plurality of shafts on which said alternators are mounted; (c) toothed-gearing connecting said shafts, so that they rotate with the relative angular velocities required; (B) mains or lines leading from said central station and fed with electrical-vibrations by means of the alternators aforesaid; (C) devices, whereby said alternators are caused to act upon the lines or mains aforesaid, as required, to produce the appropriate electrical vibrations therein; and (D) vibration-translating devices located on divers premises more or less remote from said central station, and which include, (a) a diaphragm; (b) an electro-magnet fed with electrical vibrations in a suitable manner from the lines or mains aforesaid, and serving to vibrate the diaphragm aforesaid, and (c) a reinforcing pipe or horn acted on by said diaphragm.

80. In combination in an electrical music-generating system, (a) a plurality of alternating current dynamos having vibration frequencies corresponding to the notes of a musical scale, and each having a wire-wound armature; (b) shafts for giving movement to said armatures; and (c) contact devices for taking the current from said rotating armatures.

81. In combination in an electrical music-generating system, (a) a plurality of alternating current dynamos having vibration frequencies corresponding to the notes of a musical scale, and each having a wire-wound armature; (b) shafts for giving movement to said armatures; (c) contact devices for taking the current from said rotating armatures; (d) vibration-translating devices; and (e) note-controlling devices whereby the currents taken from said armatures are caused to affect the vibration-translating devices, each armature as required.

82. In an electrical music-generating system, an organization of alternating current generators, having vibration-frequencies corresponding to the notes of a musical scale; one type of alternating current generators being used to produce the lower notes, and a different type of alternating current generators to produce the higher notes.

83. In an electrical music-generating system, an organization of alternating current generators for producing electrical-vibrations having frequencies corresponding to the notes of a musical scale through a plurality of octaves; one type of alternating current generators being used to produce the electrical-vibrations having frequencies corresponding to the notes of the lower octave or octaves of the scale aforesaid, and a different kind of alternating current generators being used to produce the electrical-vibrations having frequencies corresponding to the notes of the higher octave or octaves.

84. In an electrical music-generating system, an organization of alternating current generators for producing electrical-vibrations having frequencies corresponding to the notes of a musical scale through a plurality of octaves; said organization having wire-wound rotating armatures to produce electrical-vibrations corresponding to the notes of the lower octave or octaves of the scale aforesaid, but having rotating toothed inductors to produce electrical-vibrations corresponding to the notes of the higher octave or octaves of said scale.

85. In an electrical music-generating system, a shaft carrying a plurality of alternating current generators, constructed to have vibration frequencies standing to each other as different powers of 2, said generators serving to produce different octaves of the same note, one or more of said generators having armatures of one type and one or more of the others of said generators having armatures of a different type.

86. In an electrical music-generating system, a shaft carrying a plurality of alternating current generators constructed to have vibration frequencies standing to each other as different powers of 2, said generators serving to produce different octaves of the same note, one or more of said generators having wire-wound armatures and one or more of said generators having toothed inductors.

87. In an electrical music-generating system, and in combination (a) alternators for producing electrical vibrations having frequencies corresponding to notes of a musical scale; (b) a plurality of shafts each giving movement to a plurality of the alternators aforesaid; said alternators having armatures of two different kinds; one kind of armature being used for the lower notes of the scale aforesaid, and another kind of armature being used for the higher notes of said scale.

88. In combination, in an electrical music-generating apparatus, (a) a plurality of alternators, having frequencies corresponding to consecutive notes of a musical scale within the compass of an octave; (b) vibration-translating apparatus, whereby electrical vibrations are translated into audible aerial vibrations; and (c) switches, controlling the action of the alternators aforesaid upon the vibration-translating apparatus aforesaid, a switch for each alternator, whereby each of the alternators aforesaid may be made to act upon the vibration-translating apparatus aforesaid, by itself alone, independently of any of the other alternators aforesaid, when required.

89. In combination, in an electrical music-generating apparatus, (a) a plurality of alternators, having frequencies corresponding to consecutive notes of a musical scale within the compass of an octave; (b) vibration-translating apparatus, whereby electrical vibrations are translated into audible aerial vibrations; (c) switches, controlling the action of the alternators aforesaid upon the vibration-translating apparatus aforesaid, a switch for each alternator, whereby each of the alternators aforesaid may be made to act upon the vibration-translating apparatus aforesaid, by itself alone, independently of any of the other alternators aforesaid, when required; and (d) keys at a keyboard, controlling the switches aforesaid.

90. In combination, in an electrical music-generating apparatus, (a) a plurality of alternators, having frequencies corresponding to consecutive notes of a musical scale within the compass of an octave; (b) shafts, upon which the rotary members of said alternators are mounted; (c) toothed gearing connecting said shafts, so that they rotate without slip with the relative angular velocities required; (d) vibration-translating apparatus, whereby electrical vibrations are translated into audible aerial vibrations; and (e) switches, controlling the action of the alternators aforesaid upon the vibration-translating apparatus aforesaid, a switch for each alternator, whereby each of the alternators aforesaid may be made to act upon the vibration-translating apparatus aforesaid, by itself alone, independently of any of the other alternators aforesaid, when required.

91. In combination, in an electrical music-generating apparatus, (a) a plurality of alternators, having frequencies corresponding to consecutive notes of a musical scale within the compass of an octave; (b) shafts, upon which the rotary members of said alternators are mounted; (c) toothed gearing connecting said shafts, so that they rotate without slip with the relative angular velocities required; (d) vibration-translating apparatus, whereby electrical vibrations are translated into audible aerial vibrations; (e) switches, controlling the action of the alternators aforesaid upon the vibration-translating apparatus aforesaid, a switch for each alternator, whereby each of the alternators aforesaid may be made to act upon the vibration translating apparatus aforesaid, by itself alone, independently of any other alternator, when required; and (f) keys at a keyboard, controlling the switches aforesaid.

92. In combination, in an electrical music-generating apparatus, (a) alternators, having frequencies corresponding to consecutive notes of a musical scale; (b) one or more vibration-translating devices, for translating electrical vibrations into audible vibrations and consisting each of a diaphragm, an electro-magnet for vibrating said diaphragm and a horn or the like whose contained air is set in vibration by said diaphragm; and (c) switches, controlling the action of the alternators aforesaid upon the vibration-translating apparatus aforesaid, in general a switch for each alternator, so that, in general, each alternator may be made to act upon the vibration-translating apparatus aforesaid, by itself alone, independently of any other alternator, when required.

93. In combination, in an electrical music-generating apparatus, (a) alternators, having frequencies corresponding to consecutive notes of a musical scale; (b) one or more vibration-translating devices, for translating electrical vibrations into audible vibrations and consisting each of a diaphragm, an electromagnet for vibrating said diaphragm and a horn or the like whose contained air is set in vibration by said diaphragm; (c) switches, controlling the action of the alternators aforesaid upon the vibration-translating apparatus aforesaid, in general, a switch for each alternator, so that, in general, each alternator may be made to act upon the vibration-translating apparatus aforesaid, by itself alone, independently of any other alternator, when required; and (d) keys at a keyboard, controlling the switches aforesaid.

94. In combination, in an electrical music-generating apparatus, (a) alternators, having frequencies corresponding to consecutive notes of a musical scale; (b) shafts, upon which the rotary members of said alternators are mounted; (c) toothed gearing connecting said shafts, so that they rotate without slip with the relative angular velocities required; (d) one or more vibration-translating devices, for translating electrical vibrations into audible vibrations and consisting each of a diaphragm, an electromagnet for vibrating said diaphragm and a horn or the like whose contained air is set in vibration by said diaphragm; and (e) switches, controlling the action of the alternators aforesaid upon the vibration-translating apparatus aforesaid, in general, a switch for each alternator, so that, in general, each alternator may be made to act upon the vibration-translating apparatus aforesaid, by itself alone, independently of any other alternator, when required.

95. In combination, in an electrical music-generating apparatus, (a) alternators, having frequencies corresponding to consecutive notes of a musical scale; (b) shafts, upon which the rotary members of said alternators are mounted; (c) toothed gearing connecting said shafts, so that they rotate without slip with the relative angular velocities required; (d) one or more vibration-translating devices, for translating electrical vibrations into audible vibrations and consisting each of a diaphragm, an electro-magnet for vibrating said diaphragm and a horn or the like whose contained air is set in vibration by said diaphragm; (e) switches, controlling the action of the alternators aforesaid upon the vibration-translating apparatus aforesaid, in general a switch for each alternator, so that, in general, each alternator may be made to act upon the vibration-translating apparatus aforesaid, by itself alone, independently of any other alternator, when required; and (f) keys at a keyboard, controlling the switches aforesaid.

96. In combination, in an electrical music-generating apparatus (a) a plurality of vibration-generating devices, having frequencies corresponding respectively to consecutive notes of a musical scale within the compass of an octave, and each of such devices having, at any one time, a single frequency only; (b) vibration-translating apparatus, whereby electrical vibrations are translated into audible aerial vibrations; and (c) switches controlling the action of the vibration-translating devices aforesaid, upon the vibration-translating apparatus aforesaid, a switch for each of the vibration-generating devices, aforesaid, so that each of said vibration-generating devices may be made to act upon the vibration-generating apparatus aforesaid, by itself alone, independently of any other vibration-generating device, when required.

97. In combination, in an electrical music-generating apparatus; (a) a plurality of vibration-generating devices, having frequencies corresponding respectively to consecutive notes of a musical scale within the compass of an octave, and each of such devices having, at any one time, a single frequency only; (b) vibration-translating apparatus, whereby electrical vibrations are translated into audible aerial vibrations; (c) switches, controlling the action of the vibration-generating devices aforesaid upon the vibration-translating apparatus, aforesaid, a switch for each of the vibration-generating devices aforesaid, so that each of said vibration-generating devices may be made to act upon the vibration-translating apparatus aforesaid, by itself alone, independently of any other vibration-generating device, when required; and (d) keys at a keyboard, controlling the switches aforesaid.

98. An electrical music-generating apparatus, including in combination, (A) a plurality of vibration-generating devices, having vibration-frequencies corresponding respectively to consecutive notes of a musical scale within the compass of an octave, each of said devices having, at any one moment, a single frequency only; (B) a vibration-translating device, including, (a) a diaphragm; (b) an electro-magnet for vibrating said diaphragm; (c) a horn or air-chamber, whereby the sound proceeding from said diaphragm, is improved in quality and increased in power; and (C) switches, controlling the action of the vibration-generating devices aforesaid, upon the vibration-translating apparatus aforesaid, a switch for each of the vibration-generating devices aforesaid so that each of said vibration-generating devices may be made to act upon the vibration-translating apparatus aforesaid, by itself alone, independently of any other vibration-generating device, when required.

99. An electrical music-generating apparatus, including in combination, (A) a plurality of vibration-generating devices, having frequencies corresponding respectively to consecutive notes of a musical scale within the compass of an octave, each of said devices having, at any one moment, a single frequency only; (B) a vibration-translating device, including, (a) a diaphragm, (b) an electro-magnet for vibrating said diaphragm, (c) a horn or air-chamber, whereby the sound proceeding from said diaphragm, is improved in quality and increased in power; (C) switches, controlling the action of the vibration-generating devices aforesaid upon the vibration-translating apparatus aforesaid, a switch for each of the vibration-generating devices aforesaid, so that each of said vibration-generating devices may be made to act upon the vibration-translating apparatus aforesaid, by itself alone, independently of any other of the vibration-generating devices aforesaid, when required; and (D) keys at a keyboard, controlling the switches aforesaid.

100. In an electrical music-generating apparatus, alternators having vibration-frequencies corresponding to consecutive notes of a musical scale within the compass of an octave; a plurality of said alternators having annular armatures.

101. In an electrical music-generating apparatus, the combination of (a) alternators, for producing electrical vibrations having frequencies corresponding to consecutive notes of a musical scale, within the compass of an octave; a plurality of said alternators having annular armatures; (b) vibration-translating apparatus, whereby electrical vibrations are translated into audible aerial vibrations; and (c) note-controlling devices, whereby the alternators aforesaid are caused to sound their respective notes in the vibration-translating apparatus aforesaid, each alternator as required.

102. In an electrical music-generating apparatus, the combination of (a) alternators, having vibration-frequencies corresponding to consecutive notes of a musical scale, within the compass of an octave, a plurality of said alternators having annular armatures; (b) vibration-translating apparatus, whereby electrical vibrations are translated into audible aerial vibrations; (c) switches, whereby the alternators aforesaid are caused to act on the vibration-translating apparatus aforesaid, each alternator as required; and (d) keys, at a keyboard, controlling said switches.

103. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternator are mounted; and (c) toothed gearing connecting said shafts, so that they rotate without slip, with different angular velocities, as required.

104. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) vibration-translating apparatus, whereby electrical vibrations are translated into audible vibrations; and (e) note-controlling devices, whereby the alternators aforesaid are caused to sound their respective notes in the vibration-translating apparatus aforesaid, each alternator as required.

105. In an electrical music-generating apparatus, the combination of (a) alternators, having vibration frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) vibration-translating apparatus, whereby electrical vibrations are translated into audible vibrations; (e) switches, whereby the alternators aforesaid are caused to act on the vibration-translating apparatus aforesaid, each alternator as required; and (f) keys, at a keyboard, controlling said switches.

106. In an electrical music-generating apparatus, the combination of (a) alternators, having vibration-frequencies corresponding to consecutive notes of a musical scale, within the compass of an octave; a plurality of said alternators having annular armatures; (b) one or more vibration-translating devices, each including (i) a diaphragm; (ii) an electro-magnet, for vibrating said diaphragm, and (iii) a horn or air-chamber, whereby the sound proceeding from said diaphragm is improved in quality and increased in power; and (c) note-controlling devices, whereby the alternators aforesaid are caused to sound their respective notes in the vibration-translating apparatus aforesaid, each alternator as required.

107. In an electrical music-generating apparatus, the combination of (a) alternators, having vibration-frequencies corresponding to consecutive notes of a musical scale, within the compass of an octave; a plurality of said alternators having annular armatures; (b) one or more vibration-translating devices, each including (i) a diaphragm; (ii) an electro-magnet, for vibrating said diaphragm, and (iii) a horn or air-chamber, whereby the sound proceeding from said diaphragm is improved in quality and increased in power; (c) switches, whereby the alternators aforesaid are caused to act on the vibration-translating apparatus aforesaid, each alternator as required; and (d) keys, at a keyboard, controlling said switches.

108. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternator are mounted; (c) toothed gearing connecting said shafts, so that they rotate without slip, with different angular velocities, as required; (d) one or more vibration-translating devices, each including (i) a diaphragm; (ii) an electromagnet, for vibrating said diaphragm, and (iii) a horn or air-chamber, whereby the sound proceeding from said diaphragm is improved in quality and increased in power; and (e) note controlling devices, whereby said alternators are caused to sound their respective notes in the vibration-translating apparatus aforesaid, each alternator as required.

109. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) one or more vibration-translating devices, each including (i) a diaphragm; (ii) an electromagnet, for vibrating said diaphragm, and (iii) a horn or air-chamber, whereby the sound proceeding from said diaphragm is improved in quality and increased in power; (e) switches, whereby the alternators aforesaid are caused to act on the vibration-translating apparatus aforesaid, each alternator as required; and (f) keys, at a keyboard, controlling said switches.

110. In an electrical music-generating apparatus, the combination of (a) alternators, having vibration-frequencies corresponding to consecutive notes of a musical scale, within the compass of an octave; a plurality of said alternators having annular armatures; (b) vibration-translating apparatus, whereby electrical vibrations are translated into audible aerial vibrations; and (c) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required.

111. In an electrical music-generating apparatus, the combination of (a) alternators, having vibration-frequencies corresponding to consecutive notes of a musical scale, within the compass of an octave; a plurality of said alternators having annular armatures; (b) vibration-translating apparatus, whereby electrical vibrations are translated into audible aerial vibrations; (c) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required; and (d) keys, at a keyboard, controlling said switches.

112. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) vibration-translating apparatus, whereby electrical vibrations are translated into audible vibrations; and (e) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required.

113. In an electrical music-generating apparatus, the combination of (a) alternators, having vibration frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) vibration-translating apparatus, whereby electrical vibrations are translated into audible vibrations; (e) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required; and (f) keys, at a keyboard, controlling said switches.

114. In an electrical music-generating apparatus, the combination of (a) alternators, having vibration-frequencies corresponding to consecutive notes of a musical scale, within the compass of an octave; a plurality of said alternators having annular armatures; (b) one or more vibration-translating devices, each including (i) a diaphragm; (ii) an electro-magnet, for vibrating said diaphragm, and (iii) a horn or air-chamber, whereby the sound preceeding from said diaphragm is improved in quality and increased in power; and (c) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required.

115. In an electrical music-generating apparatus, the combination of (a) alternators, having vibration-frequencies corresponding to consecutive notes of a musical scale, within the compass of an octave; a plurality of said alternators having annular armatures; (b) one or more vibration-translating devices, each including (i) a diaphragm; (ii) an electro-magnet, for vibrating said diaphragm, and (iii) a horn or air-chamber, whereby the sound proceeding from said diaphragm is improved in quality and increased in power; (c) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required; and (d) keys, at a keyboard, controlling said switches.

116. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) one or more vibration-translating devices, each including (i) a diaphragm; (ii) an electro-magnet, for vibrating said diaphragm, and (iii) a horn or air-chamber, whereby the sound proceeding from said diaphragm is improved in quality and increased in power; and (e) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required.

117. In an electrical music-generating apparatus, the combination of (a) alternators, having vibration-frequencies corresponding to consecutive notes of a musical scale, within the compass of an octave; a plurality of said alternators having annular armatures; (b) shafts, on which the rotary members of said alternators are mounted; (c) toothed gearing connecting said shafts, so that they rotate without slip, with different angular velocities, as required; (d) one or more vibration-translating devices, each including (i) a diaphragm; (ii) an electro-magnet, for vibrating said diaphragm, and (iii) a horn or air-chamber, whereby the sound proceeding from said diaphragm is improved in quality and increased in power; (e) switches, controlling the action of the alternators aforesaid upon the vibration-translating apparatus aforesaid, a switch for each of the alternators aforesaid; so that each of said alternators may be made to act upon the vibration-translating apparatus aforesaid, by itself alone, independently of any of the other alternators aforesaid, when required; and (f) keys, at a keyboard, controlling said switches.

118. In an electrical music-generating system, the improvement which consists in generating, by induction, continuously and simultaneously, in normally-open circuits, corresponding to the notes of a musical scale, electrical-vibrations having frequencies corresponding to the notes of such scale and in closing those circuits from time to time, to sound the several notes, each as required.

119. In an electrical music-generating system, the improvement which consists (a) in generating, by induction, continuously and simultaneously, in normally-open circuits, corresponding to the notes of a musical scale, electrical-vibrations having frequencies corresponding to the notes of such scale; (b) and in closing, from time to time, the circuits corresponding to the notes which it is desired to sound; (c) propagating vibrations from the closed circuit or circuits aforesaid to a suitable vibration-translating device; and (d) translating the electrical vibrations, so propagated, into audible aerial vibrations.

Signed at Washington in the District of Columbia, this sixteenth day of February, A. D. 1904, in the presence of the subscribing witnesses whose signatures are hereto affixed.

THADDEUS CAHILL.

Witnesses:
WALDO CLARK,
HENRY E. COOPER.